United States Patent
Agrawal et al.

(10) Patent No.: US 12,019,943 B2
(45) Date of Patent: Jun. 25, 2024

(54) FUNCTION BASED SELECTIVE SEGMENTED VIDEO FEED FROM A TRANSMITTING DEVICE TO DIFFERENT PARTICIPANTS ON A VIDEO COMMUNICATION SESSION

(71) Applicant: MOTOROLA MOBILITY LLC, Wilmington, DE (US)

(72) Inventors: Amit Kumar Agrawal, Bangalore (IN); Bill Ryan, Libertyville, IL (US); Jeffrey S Vanhoof, Gurnee, IL (US); Daniel M Vacura, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 208 days.

(21) Appl. No.: 17/826,683

(22) Filed: May 27, 2022

(65) Prior Publication Data
US 2023/0409271 A1 Dec. 21, 2023

(51) Int. Cl.
*G06F 3/14* (2006.01)
*G06F 3/0482* (2013.01)
*G06V 10/25* (2022.01)
*G06V 20/40* (2022.01)
*H04L 65/401* (2022.01)

(52) U.S. Cl.
CPC .......... *G06F 3/1454* (2013.01); *G06F 3/0482* (2013.01); *G06V 10/25* (2022.01); *G06V 20/49* (2022.01); *H04L 65/4015* (2013.01); *G06T 2200/24* (2013.01)

(58) Field of Classification Search
CPC ........ G06F 3/1454; G06F 3/14; G06F 3/0482; G06V 10/25; G06V 20/49; H04L 65/4015
See application file for complete search history.

(56) References Cited

U.S. PATENT DOCUMENTS

| | | |
|---|---|---|
| 11,756,302 B1 * | 9/2023 | Agrawal ................ G06V 20/49 386/241 |
| 2015/0281649 A1 | 10/2015 | Ehmann et al. |
| 2015/0304604 A1 * | 10/2015 | Sharma ............ H04N 21/42203 348/14.02 |
| 2017/0111595 A1 | 4/2017 | Soni et al. |
| 2023/0008199 A1 | 1/2023 | Yu et al. |
| 2023/0262317 A1 * | 8/2023 | O'Leary ............. H04L 65/1069 |
| 2023/0386162 A1 * | 11/2023 | Agrawal .............. G06V 40/103 |

* cited by examiner

*Primary Examiner* — Olisa Anwah
(74) *Attorney, Agent, or Firm* — Isidore PLLC

(57) ABSTRACT

A method provides concurrent transmission of a virtual action center with a primary segment cropped from a video image, enabling remote participant control of aspects of the primary segment. The method includes identifying a primary region of interest (ROI) within a video image and delineating the video image into a primary segment encompassing the primary ROI and a secondary segment. The method includes associating a virtual action center within a location of the secondary segment and assigning control features of the virtual action center to the second device connected via a video communication session. The method includes transmitting the primary segment and concurrently transmitting the features/functions of the virtual action center to the second device, enabling the second device to concurrently present, on its display, the primary segment and the virtual action center as portions of a received video stream, providing second device control of content within the primary segment.

20 Claims, 18 Drawing Sheets

FUNCTION BASED SELECTIVE SEGMENTED VIDEO FEED FROM A TRANSMITTING DEVICE TO DIFFERENT PARTICIPANTS ON A VIDEO COMMUNICATION SESSION

CROSS-REFERENCE TO RELATED APPLICATIONS

This application is related to U.S. application Ser. Nos. 17/826,603, 17/826,639, and 17/826,735, filed on May 27, 2022, the contents of which are fully incorporated herein by reference.

BACKGROUND

1. Technical Field

The present disclosure generally relates to electronic devices with video capturing capabilities and in particular to electronic devices with video capturing capabilities that are utilized within a video communication session.

2. Description of the Related Art

Modern smartphones are equipped with some of the best digital cameras in the consumer market. Smartphones are often utilized to enable video communication sessions with a second device, where the front camera is used to focus on the user while the display presents the video received from the second device. However, given the limitations in screen size, persons engaged in video communication sessions, such as a video conference, often prefer to use their laptops or desktop devices that present a much larger display for viewing the received video within the communication application interface that can also present one of more communication application settings icons/menu items.

Unlike the high-quality inbuilt cameras of the smartphones, the built-in webcams of laptops and external universal serial bus (usb)-connected webcams are very basic and provide limited video options for the user who utilizes their personal computer (PC) or laptop to engage in a video communication session. Because of the low quality of the video images captured by these webcams, recent solutions have been provided for smartphone users to utilize the better-quality cameras available with their smartphones to capture the video that is transmitted as the video feed in video communication sessions with other devices. The smartphones are wired or wirelessly connected to the PC, which provides a larger display device for video review and viewing.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
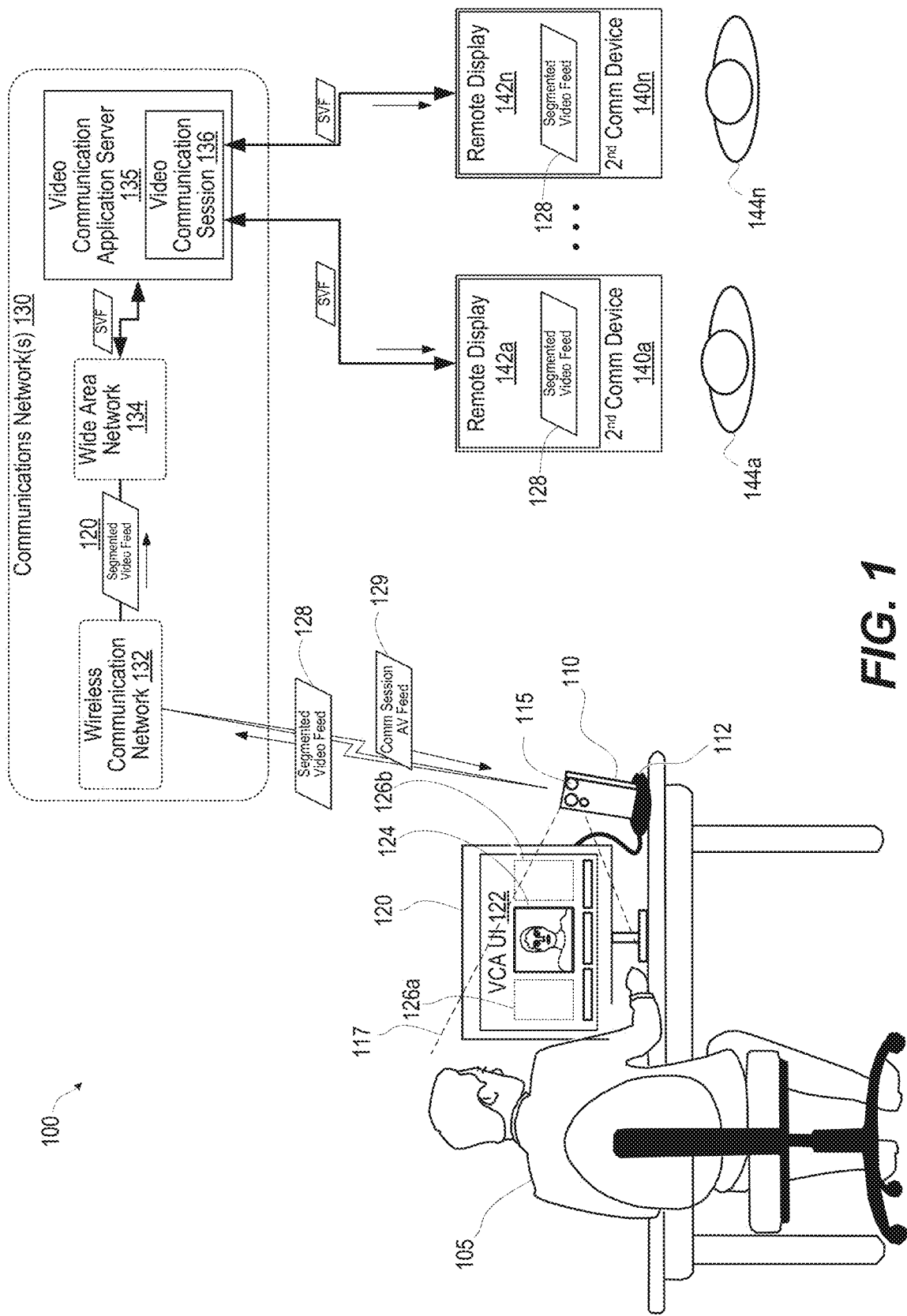
FIG. 1 illustrates an example video communication session environment having a primary electronic device exchanging a segmented video feed with at least one second electronic device via a video communication session, according to one or more embodiments.

An electronic device, a method, and a computer program product provides concurrent transmission of a virtual action center with a primary segment cropped from a video image, enabling remote participant control of aspects of the primary segment. The method includes identifying a primary region of interest (ROI) within a video image and delineating the video image into a primary segment encompassing the primary ROI and a secondary segment. The method includes associating a virtual action center within a location of the secondary segment and assigning control features of the virtual action center to the second device connected via a video communication session. The method includes transmitting the primary segment and concurrently transmitting the features/functions of the virtual action center to the second device, enabling the second device to concurrently present, on its display, the primary segment and the virtual action center as portions of a received video stream, providing second device control of content within the primary segment.

According to a first aspect of the disclosure, an electronic device, a method, and a computer program product provides segmenting of a video image into a primary and secondary segments and presentation of a touchless action center in a display area of one or more of the secondary segments to support touchless user interfacing and control during a preview of the video image.

In a first embodiment of the first aspect, an electronic device includes at least one image capturing device that captures video of a local scene and an interface by which the electronic device connects to a display device. The electronic device also includes a memory having stored thereon a video image segmentation and control module (VISCM) that provides program instructions for spatially delineating video images into two or more segments that can be individually presented within or excluded from a video preview and/or video feed. The electronic device also includes at least one processor communicatively coupled to the display device, to each of the at least one image capturing device, and to the memory. The at least one processor executes the program instructions of the VISCM, which causes the at least one processor to identify a primary region of interest (ROI) within a video image captured by the at least one image capturing device, the primary region of interest being a smaller area than the video image. The at least one processor delineates the video image into two or more segments, including a primary segment that encompasses the primary ROI and at least a secondary segment. The at least one processor then associates a touchless action center with a virtual interface with a location of the secondary segment in the video image. The virtual interface includes at least one feature that can be selected via one of air gestures and screen touches during presentation of the primary segment of the video image. The at least one processor then presents a preview of the delineated segments of the video image on the display device with at least the primary segment and the secondary segment of the video image and the virtual interface being visible within the display device.

According to one or more embodiments, the processor is further configured to detect, within a captured video image, one or more air gestures proximate to a location of a specific feature among the at least one feature within the virtual interface, the one or more air gestures representing a selection of the specific feature. The at least one feature comprises at least one of image capturing device configuration and settings, video image presentation settings, local device settings, and application settings for a video conference application enabling a video communication session with at least the second device. The processor is further configured to, in response to identifying the selection of the specific feature, enable a corresponding function associated with the specific feature concurrently with a capturing and transmission of at least the primary segment of the video image.

According to one or more embodiments, the processor is further configured to identify selection of the specific feature, which activates a function that modifies one or more characteristics of at least the content within the primary segment of the video image, apply the function to an original content within at least the primary segment to generate a resulting modified content, and locally present and remotely transmit the resulting modified content within the primary segment in place of original content.

According to one or more embodiments, the processor is further configured to transmit only content within the primary segment to a communicatively-connected second device to which the video image is to be shared. The secondary segment(s) and the associated virtual interfaces of the touchless action center are only presented during the video preview on the local display device.

Additional embodiments provide a method and a computer program product that provide similar functions as the described embodiments of the electronic device.

According to a second aspect of the disclosure, an electronic device, a method, and a computer program product provides granular transmission of select segments of a segmented video image along with a touchless action center to at least one second device among a plurality of second devices that are communicatively connected by a video communication session to enable the at least one second device to control one or more features or functions associated with the video feed being transmitted by the electronic device.

In a first embodiment of the second aspect, the electronic device also includes a communication interface that enables the electronic device to communicatively connect and exchange video data with a plurality of second devices during a video communication session. The at least one processor is communicatively coupled to the display device, to each of the at least one image capturing device, to the communication interface, and to the memory. The processor processes instructions of the VISCM, which causes the at least one processor to identify a primary region of interest (ROI) within a video image captured by the at least one image capturing device, the primary region of interest being a smaller area than the video image. The processor delineates the video image into two or more segments, including a primary segment that encompasses the primary ROI and at least one secondary segment. The processor links/presents/associates an action center with a virtual interface within a location of one or more of the at least one secondary segment in the video image. The virtual interface includes at least one feature that can be selected via one of air gestures and screen touches during presentation of the primary segment of the video image. The processor assigns control features of the virtual interface with at least one selected second device from among the plurality of second devices. The processor transmits, to each of the plurality of second devices, at least the primary segment for displaying at a second display of a corresponding second device during the video communication session. The processor concurrently transmits, to each of the at least one selected second device, the control features of the virtual interface assigned with the at least one selected second device to trigger the at least one selected second device to present the virtual interface on a second display device, concurrently with presenting the primary segment as parts of a combined video stream from the electronic device. Accordingly, each of the plurality of second devices can be transmitted a different combination of segmented video images comprising at least the primary segment with zero or more virtual interfaces remotely presented on a respective second display for selection at a respective at least one selected second device.

In one or more embodiments, to associate the virtual interface with the at least one selected second device from among the plurality of second devices, the at least one processor presents a conference participant interface that receives a selection ranging from between none (zero) to one or more virtual interfaces to provide to a particular second device identified via an associated participant name. And, in response to receiving the selection, the at least one processor associates a selected one or more virtual interfaces with the particular second device. The at least one processor presents, on the local display device, a local preview window including a visual indication of which of the one or more virtual interfaces are associated for transmission to each of the plurality of second devices designated to receive at least one virtual interface within a transmitted video stream.

According to one or more embodiments, the at least one processor detects selection of the particular second device as an administrative device and auto-selects specific virtual interfaces having functions controllable by the administrative device. The at least one processor then transmits the auto-selected virtual interfaces concurrently with the primary segment to enable virtual interfaces to be visually presented within the second display of the particular second device concurrently with the primary segment. The at least one processor further monitors for receipt of an indication of a remote selection or activation of at least one control function from within the virtual interfaces at the particular second device. And, in response to receiving an indication of a remote selection that is associated with a modification of a characteristic of the video images within the primary segment, the at least one processor applies the modification to video image content within the primary segment at the electronic device and transmits the modification of the video image content to each of the plurality of second devices participating in the video communication session.

According to a third aspect of the disclosure, an electronic device, a method, and a computer program product provides an electronic device that receives the primary segment of a segmented video image along with a touchless action center from a video communication session and controls features of the primary segment at an image stream transmitting (IST) device via the virtual interface of a touchless action center that is also transmitted by the IST device to the electronic device. The device includes a communication interface that enables the electronic device to communicatively connect with and receive video data from the IST device during a video communication session. The at least one processor receives the segmented video stream with the primary segment presenting a region of interest captured at the IST device and the at least one secondary segment, each presenting a respective virtual control interface. The processor presents, on the local display device, a control enabling view of the segmented video stream, including both the primary segment and the at least one secondary segment with the respective virtual control interface. Each virtual control interface further presents at least one selectable feature that can be selected by an input from among a screen touch and an air gesture during local presentation of the received segmented video stream. The processor monitors for movement captured by the at least one image capturing device that is indicative of the input occurring within a spatial location proximate to the selectable feature within a corresponding secondary segment. And, in response to detecting the input, identify a function associated with the selectable feature and activate the function to affect one or more characteristics of a video image presented within the primary segment.

In a first embodiment of the second aspect, the selectable feature modifies at least one characteristic of content visibly presented within the primary segment, and the processor modifies the characteristic of the content in response to the input. In one or more embodiments, the processor modifies the characteristic of the content at the IST device by transmitting a corresponding content settings update indication to the IST device via the video communication session. In one or more embodiments, the processor modifies the characteristic of the content for at least one of: the electronic device only; and all connected devices participating in the video communication session that receive the primary segment from the IST device.

According to a fourth aspect of the disclosure, an electronic device, a method, and a computer program product provides transmission of select segments of a segmented video image along with a touchless action center to a second device that is communicatively connected by a video communication session to enable the second device to control one or more features or functions associated with the video feed being transmitted by the electronic device.

In a first embodiment of the fourth aspect, the electronic device includes a memory having stored thereon a video image segmentation and control module (VISCM) and a demonstration object preview module (DOPM). The VISCM includes first program instructions for spatially delineating video images into two or more segments that can be individually presented or hidden within a video feed, and the DOPM includes second program instructions for selectively reversing image mirroring to previews of individual segments of a video feed. The processor processes the first and second program instructions of the VISCM and the DOPM, which configures the at least one processor to identify a demonstration object within a video image captured by the at least one image capturing device, the demonstration object being in a defined area of the video image. The processor spatially segments the video image into two or more segments, including a primary segment that encompasses the defined area with the demonstration object and at least one secondary segment encompassing a remaining portion of the video image. The processor then presents a preview of the delineated segments of the video image on the local display device, with the remaining portion of the video image mirrored within the preview and at least the primary segment presented without mirroring in a correct spatial location relative to the remaining portion of the video image. The person who is presenting the demonstration object receives a non-mirrored, preview presentation of the demonstration object.

In a first embodiment of the fourth aspect, the processor spatially segments and reorients the primary segments relative to the mirrored view of the secondary segment in response to activation of a demonstration object preview (DOP) option within an application supporting presentation of a camera image preview. In one or more embodiment, the processor divides the remaining portion into at least a second and a third segments, with the secondary segment encompassing a primary region of interest and the third segment encompassing sections of the video image than can be selectively cropped from the remaining portion of the video image. The processor presents a virtual interface on the display device, visibly adjacent to or integrated as an overlay on top of the third segment. The processor presents, within the virtual interface, the demonstration object preview (DOP) option, which is selectable via the virtual interface by one or more of an air gesture and a touch of a spatial area of the virtual interface on the display device.

According to one or more embodiments, the processor reorients at least one of an exterior boundary of the primary segment and a view angle of primary segment to present substantially seamlessly fit of the primary segment into a space from which the primary segment is remove within the remaining portion of the video image during a segmentation and preview generation process.

Each of the described features and functions of the primary, second, third, and fourth aspects, which are presented as operations performed by the processor(s) of electronic devices are also described as features and functions provided by a plurality of corresponding methods and computer program products, within the various different embodiments presented herein. In the embodiments presented as computer program products, the computer program product includes a computer readable storage device having stored thereon program instructions or code that, when processed by at least one processor of an electronic device, such as described above, enables the electronic device to complete the functionality of a respective one of the above-described processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

One motivation for implementation of the segmenting of a video feed/image and presentation of the virtual action center within a local preview is the recognition of the unmet need with conventional video conferencing applications that utilize the camera of a smartphone that is tethered to a larger display for image capturing. With these video conferencing applications, the smartphone provides video of the entire local scene that is captured by the phones' camera sensors within the transmitted video feed to the remote participants of the video communication session. While tracking of the user can be performed by the sophisticated devices, if the user is not within arms-length of the phone, the user is unable to control the camera or application settings unless the user comes closer to the smartphone and uses his/her hands to taps the settings icon on the smartphones local display. Oftentimes, the cameras being utilized in these scenarios are the rear cameras, which are typically better cameras for video capture, and the devices display is then not located on the side that is readily accessible to the user. While in active video communication, every action taken by the user to adjust or move the camera is captured within the field of view of the rear camera and is transmitted to all of the participants receiving the video feed of the local user.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within communication device 110 (FIGS. 2A-2B) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example video communication session (VCS) environment 100 having a first communication device 110 exchanging a segmented video feed 128 via the communication session 136 with at least one second electronic device 120A-120N, according to one or more embodiments. First communication device 110 is an electronic device that (i) supports video communication with other devices, includes one or more image capturing devices/sensors (i.e., cameras), and which provides the capability of being utilized as a web camera during the video communication session. In one or more embodiments, communication device 110 is a mobile phone and/or incorporates the features of a mobile phone. According to one or more embodiment, communication device 110 can be interchangeably referred to as image stream transmitting (IST) device. Communication device 110 is also interchangeably referred to as first communication device 110 to distinguish from second communication devices 140a-140n. For simplicity in describing certain features of the disclosure, where second communication devices 140a-140n are individually referenced as different communication devices, second communication devices 140a-140n can be individually presented as second communication device 140a and third communication device 140n.

Returning to FIG. 1, VCS environment 100 includes a local participant 105 who communicatively connects to video communication session 136 using mobile communication device 110 that is wired or wirelessly connected to display 120. Display 120, which can also be referred to as a display device, is a local display. The displays associated with the second communication devices 140a-140n are referred to as second displays or remote displays. Display 120 is also external to communication device 110 and can thus be referred to as external display 120. Communication device 110 is positioned on a desk proximate to local participant 105. In the described embodiments, communication device 110 is a smartphone held by docking dongle 112 and includes several (i.e., at least one) image capturing sensors/device (ICD) 115. Docking dongle 112 provides a wired USB connection to large display device 120 on which video images captured by ICD 115 and video feeds (129) received from video communication session 136 can be displayed for viewing by local participant 105. ICD 115 captures a field of view (FOV) (illustrated by the dashed lines and generally presented as FOV 117) of local space including the local participant 105. ICD 115 generates video images that are presented within a video communication application (VCA) user interface 122 on display 120 for preview by local participant 105. According to one aspect of the disclosure, communication device 110 segments the locally captured video images to provide a primary segment 124 that includes the region of interest (ROI), which is typically a face and upper torso of local participant 105. Additionally secondary segments then provide the remaining content captured within the local scene. According to one aspect of the disclosure, local preview on display 120 can also provide additional virtual control panels 126a,126b, which occupy or overlay segments of the original video image that are not within the primary segment.

Communication device 110 transmits segmented video feed 128 comprised of at least the primary segment through communications network 130, which includes wireless communication network 132 and associated physical networking components and wide area network 134 and associated physical networking components. Wide area network 134 provides or supports connection by video communication application server(s) 135, which is one or more physical components or logical partitions within servers that process server-level functions for video communication session 136. Segmented video feed 128 is forwarded by video communication application server(s) 135 to each session-connected second communication device 140a-140n, which presents segmented video feed 128 on respective remote displays 142a-142n for viewing by their respective remote participants 144a-144n.

It is appreciated that the term segmented video feed can mean different things within the context of the various different aspects of the disclosure. The received video feed is a complete video feed that appears seamless to the remote participants 144a-144n, but can comprise only one of (or less than a full complement of) multiple segments into which the original video stream captured at the local ICD 115 is divided/delineated.

Figure 2A:
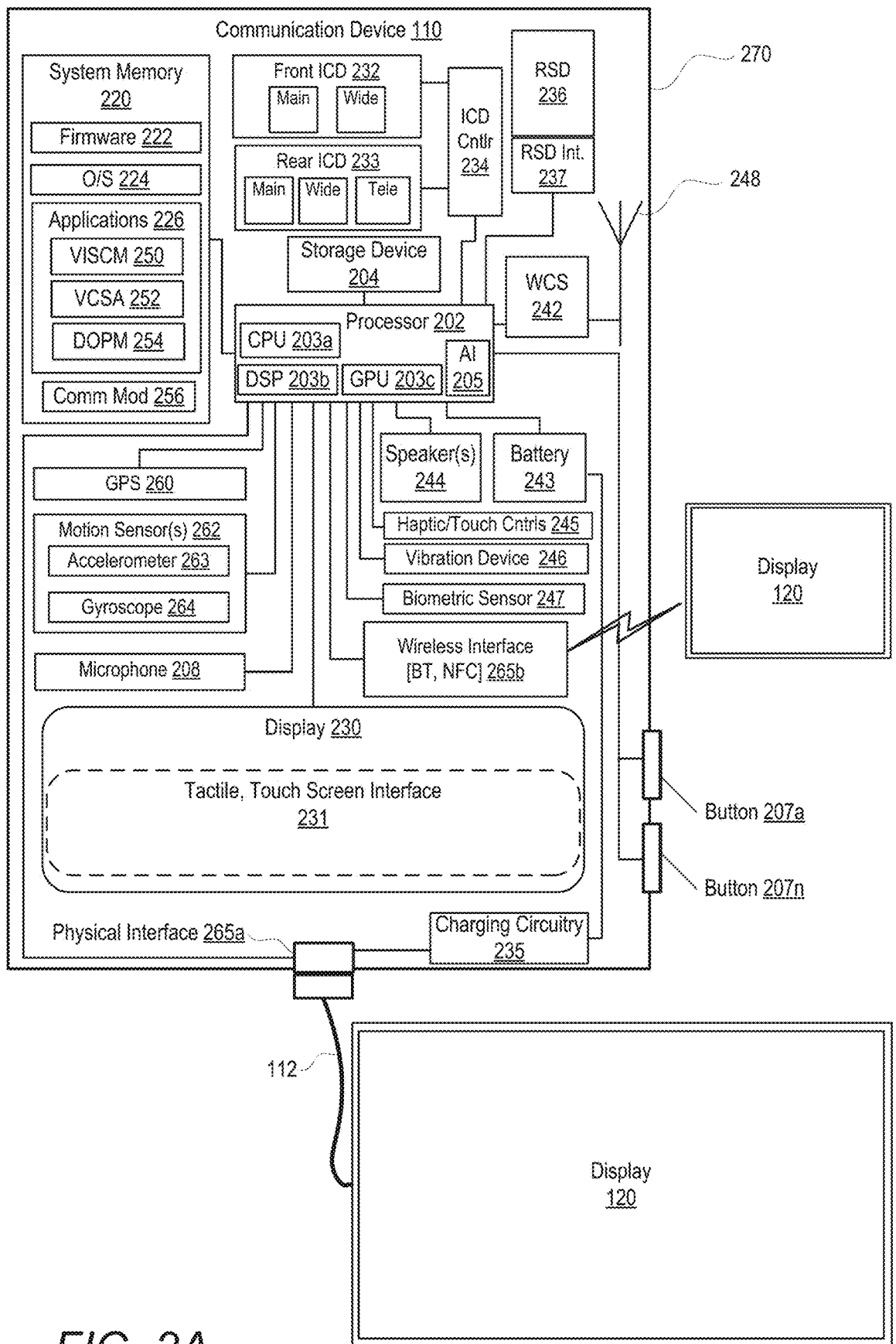
FIG. 2A depicts an example communication device with an attached external display and within which various aspects of the disclosure can be implemented, according to one or more embodiments.

Turning now to FIG. 2A, there is depicted an example communication device 110 within which various aspects of the disclosure can be implemented, according to one or more embodiments. Examples of such communication devices include, but are not limited to, mobile devices, a notebook computer, a mobile phone, a smart phone, a digital camera with enhanced processing capabilities, a smart watch equipped with an ICD and enhanced processing, a tablet computer, and other types of communication device that incudes or can be directly tethered to an ICD. It is appreciated that communication device 110 can be other types of electronic devices that include at least one front facing camera or one rear facing camera and which supports both video and non-video communication with one or more second communication devices.

Communication device 110 includes processor 202 (or processor integrated circuit (IC) chip), which includes processor resources such as central processing unit (CPU) 203*a*, communication signal processing resources such as digital signal processor (DSP) 203*b*, and graphics processing unit (GPU) 203*c*. Processor 202 can, in some embodiments, include high quality camera image signal processors (ISPs) (not shown) and dedicated artificial intelligence (AI) engines 205. Collectively, processor 202 supports computing, classifying, processing, transmitting and receiving of data and information, and presenting of graphical images within a display. Processor 202 is communicatively coupled to storage device 204, system memory 220, input devices, introduced below, output devices, including integrated display 230, and image capture device (ICD) controller 234. According to one or more embodiments, ICD controller 234 performs or supports functions such as, but not limited to, selecting and activating an active camera from among multiple cameras, adjusting the camera settings and characteristics (e.g., shutter speed, f/stop, ISO exposure, zoom control, etc.) of the active camera, etc. ICD controller 234 can perform these functions in response to commands received from processor 202, which processes instructions of camera control module (296, FIG. 2B) to cause one or more of ICDs 232, 233 to capture video images of a local scene within a FOV (117) of the operating ICD. In one or more embodiments, the functionality of ICD controller 234 is incorporated within processor 202, eliminating the need for a separate ICD controller.

For simplicity in describing the features presented herein, the various camera selection, activation, and configuration functions performed by the ICD controller 234 are described as being provided generally by processor 202. Similarly, manipulation of captured images and videos are typically performed by GPU 203*c*, and certain aspects of device communication via wireless networks are performed by DSP 203*b* with support from CPU 203*a*. However, for simplicity in describing the features of the disclosure, the functionality provided by one or more of CPU 203*a*, DSP 203*b*, and GPU 203*c* are collectively described as being performed by processor 202.

Throughout the disclosure, the term image capturing device (ICD) is utilized interchangeably to be synonymous with and/or refer to any one of front or rear facing cameras 232, 233. Front facing cameras (or image capture device (ICD)) 232 and rear facing cameras 233 are communicatively coupled to ICD controller 234, which is communicatively coupled to processor 202. Both sets of ICDs 232, 233 includes image sensors that can capture images that are within the field of view (FOV) of respective ICD 232, 233. Communication device 110 can includes multiple cameras having different functionality, such as a main camera capturing standard view, wide angle camera that captures a wide angle FOV, and telephoto ICD, which captures a telephoto FOV (zoom or magnified). In one or more embodiments, a single camera can be provided with camera control options to change the single camera lends to allow for wide angle and telephoto image capture.

System memory 220 may be a combination of volatile and non-volatile memory, such as random access memory (RAM) and read-only memory (ROM). System memory 220 can store program code or similar data associated with firmware 222, an operating system 224, and/or applications 226. During device operation, processor 202 loads and executes/processes program code of the various applications, modules, OS and firmware, that are stored in system memory 220.

In accordance with one or more embodiments, applications 226 include, without limitation, video image segmentation and control module (VISCM) 250, video communication session application (VCSA) 252, demonstration object preview module (DOPM) 254, and communication module 256. As the names suggest, each module and/or application (250-256) provides program instructions that are processed by processor 202 to cause processor 202 and/or other components of communication device 110 to perform specific operations, as described herein. Specifically, VCSA 252 and communication module 256 include program instructions that supports communication device 110 establishing a communication session with other external devices and systems, such as VCA server 135 and second communication devices 140*a*-140*n*. VISCM includes program instructions the support processor 202 delineating parts of a video feed into segments that can be separately presented and/or transmitted and instructions that support processor 202 presenting the touchless action centers with virtual interfaces and functionality associated therewith.

In one or more embodiments, communication device 110 includes removable storage device (RSD) 236, which is inserted into RSD interface 237 that is communicatively coupled via system interlink to processor 202. In one or more embodiments, RSD 236 is a non-transitory computer program product or computer readable storage device. RSD 236 may have a version of one or more of the applications (250, 252, 254) stored thereon. Processor 202 can access RSD 236 to provision communication device 110 with program code that, when executed/processed by processor 202, the program code causes or configures processor 202 and/or generally communication device 110, to provide the various different functionality described herein.

Communication device 110 includes an integrated display 230 which incorporates a tactile, touch screen interface 231 that can receive user tactile/touch input. As a touch screen device, integrated display 230 allows a user to provide input to or to control communication device 110 by touching features presented within/below the display screen. The tactile, touch screen interface 231 can be utilized as an input device. In some implementations, display 230 is integrated into a front surface of communication device 110, while the higher quality ICDs are located on a rear surface. Communication device 110 is placed in an orientation with the higher quality ICDs facing the scene being captured and integrated display located away from the subject of interest.

As one aspect of the disclosure, communication device 110 also includes external display 120, which is communicatively coupled to communication device 110 via a physical interface 265*a* or a wireless interface 265*b*. Display 230 can be one of a wide variety of display screens or devices, such as a liquid crystal display (LCD) and an organic light emitting diode (OLED) display.

Wireless interface 265*b* can be a short-range wireless communication device providing Bluetooth, near field communication (NFC) and/or a wireless fidelity (Wi-Fi) connections. In one embodiment, communication device 110 can receive internet or Wi-Fi based calls via wireless interface 265b. In one embodiment, communication device 110 can communicate wirelessly with externally provided WiFi router via wireless interface 265b. In an embodiment, WCS 242, antenna(s) 248 and wireless interface 265b collectively provide communication interface(s) of communication device 110. These communication interfaces enable communication device 110 to communicatively connect to at least one second communication device 140 (FIG. 1) via at least one network.

Physical interface 265a of communication device 110 can serve as a data port and can be coupled to charging circuitry 235 and device battery 243 to enable recharging of device battery 243. Enabling the audio communication aspects for video communication session, communication device 110 further includes microphone 208, one or more output devices such as speakers 244, and one or more input buttons 207a-207n. Input buttons 207a-207n may provide controls for volume, power, and image capture device 232, 233. Microphone 208 can also be referred to as an audio input device. Microphone 208 and input buttons 207a-207n can also be referred to generally as input devices.

Communication device 110 further includes wireless network communication subsystem (WCS) 242, which can represent one or more front end devices (not shown) that each coupled to one or more antennas 248. In one or more embodiments, WCS 242 can include a communication module with one or more baseband processors or digital signal processors, one or more modems, and a radio frequency (RF) front end having one or more transmitters and one or more receivers. WCS 242 and antennas 248 allow communication device 110 to communicate wirelessly with a wireless communication network 132 (FIG. 1) via transmissions of communication signals to and from network communication devices, such as base stations or cellular nodes, of wireless communication network 132.

Wireless communication network 132 further allows communication device 110 to wirelessly communicate with second communication devices 140a-140n, which can be similarly connected to wireless communication network 132. Communication device 110 can also communicate wirelessly with wireless communication network 132 via communication signals transmitted by short range communication device(s) (264) to and from an external WiFi router, which is communicatively connected to network 132. In one or more embodiment, wireless communication network 132 can include one or more servers (e.g., 135) that support exchange of wireless data and video and other communication between communication device 110 and second communication device 140a-140n.

Communication device 110 further includes haptic touch controls 245, vibration device 246, fingerprint/biometric sensor 247, global positioning system (GPS) device 260, and motion sensor(s) 262. Vibration device 246 can cause communication device 110 to vibrate or shake when activated. Vibration device 246 can be activated during an incoming call or message in order to provide an alert or notification to a user of communication device 110. In one or more embodiments, vibration device 246 can be used to inform the user when delineation and separation of the segments of a video image occurs and/or when a gesture is detected and accepted. According to one aspect of the disclosure, integrated display 230, speakers 244, and vibration device 246 can generally and collectively be referred to as output devices.

Biometric sensor 247 can be used to provide biometric data, such as fingerprints, to identify or authenticate a user. GPS device 260 can provide time data and location data about the physical location of communication device 110 using geospatial input received from GPS satellites.

Motion sensor(s) 262 can include one or more accelerometers 263 and gyroscope 264. Motion sensor(s) 262 can detect movement of communication device 110 and provide motion data to processor 202 indicating the spatial orientation and movement of communication device 110. Accelerometers 263 measure linear acceleration of movement of communication device 110 in multiple axes (X, Y and Z). For example, accelerometers 263 can include three accelerometers, where one accelerometer measures linear acceleration in the X axis, one accelerometer measures linear acceleration in the Y axis, and one accelerometer measures linear acceleration in the Z axis. Gyroscope 264 measures rotation or angular rotational velocity of communication device 110. In one or more embodiments, the measurements of these various sensors can also be utilized by processor 202 in the determining of the context of a communication. Communication device 110 further includes housing that contains/protects the components internal to communication device 110.

Figure 2B:
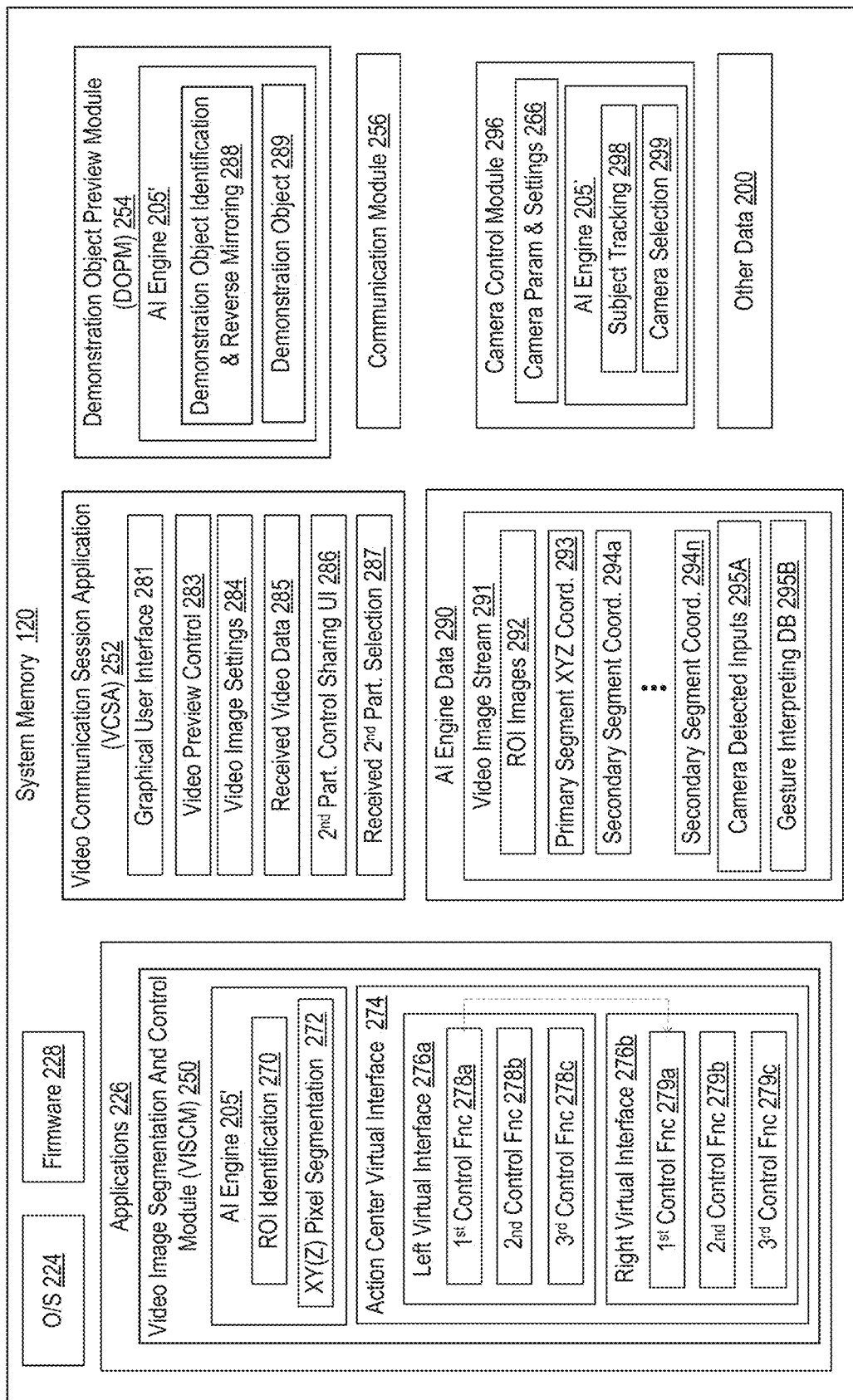
FIG. 2B is a block diagram of example contents of the system memory of the example communication device of FIG. 2A, according to one or more embodiments.

Referring to FIG. 2B, there is shown one embodiment of example contents of system memory 220 of communication device 110. As generally introduced within FIG. 2A, system memory 220 includes data, software, and/or firmware modules, including applications 226, operating system 224, firmware 228, and communication module 256. Applications generally include VISCM 250, VCSA 252, DOPM 254, and camera control module (CCM) 296.

Each of the various modules and applications includes program instructions/code that is processed by processor 202 and in some instances AI engine 205 to configure communication device 110 to perform the various different features of the present disclosure. In one or more embodiments, several of the modules include a representation of AI engine 205', which can further include a machine learning (ML) engine (not separately shown) and computer vision (CV) engine (not separately shown). AI engine 205' enables communication device 110 to identify a region of interest (ROI) within a locally captured video stream, track one or more subjects within a video stream, identify gesture provided inputs and associate the inputs with appropriate functions provide within virtual control interfaces, and identify text demonstration objects within a video stream, as well as other features and functions presented herein. In one or more embodiments, execution of the various modules by processor 202 enables/configures communication device 110 to perform the method processes presented in the various different flowcharts, as will be described below.

VISCM 250 includes or utilized a local representation of AI engine 205' which provides the functions of ROI identification 270 and XY(Z) pixel segmentation 272. As provided within AI engine data 290, AI engine 205' received video image stream 291 and detects specific subjects, such as a human, that are to be represented within ROI images 292. Once ROI image 292 is detected within video image stream 291, AI engine 205' determines a primary segment having primary segment XYZ coordinates 293. Once the coordinates of the primary segment are identified and the primary segment delineated, AI engine 205' identifies secondary segment coordinates 294a-294n, which further delineate each of the secondary segments. AI engine 205' provides processor 202 with the required pixel coordinates for the primary segment and also for the side, secondary segments that can be utilized for presenting the action centers with virtual user interface functions. In one embodiment, AI engine 205' also monitors video image stream 291 for images within the physical space proximate to the presented locations of the action center(s) on the display device. AI engine data 290 thus includes camera detected hand gestures/inputs 295A and gesture identifying/interpreting database 295B that can include various different gestures or hand/finger movements that correspond to a selection/activation of an action feature/function within the virtual interface. It is appreciated that one or more of the presented AI engine operations may be performed by other processor components.

According to one feature of the disclosure, in response to detection of multiple potential subjects within a received video image, the processor identifies, via artificial intelligence (i.e., AI engine), a primary subject from among the multiple potential subjects and aligns the primary segment with an ROI that incorporates the primary subject.

VISCM 250 also includes action center virtual interface module 274, which supports generation and presentation of action centers within or proximate to the displayed location of one or more of the secondary segments. In the illustrative example of FIG. 2, both a left and a right virtual interface 276a, 276b are presented, each having respective virtual control functions (or selections or control features) 278a-278c and 279a-279c. At least one of the left control functions, e.g., first control function 278a is linked to and activates selection of one or more of right control functions, e.g., 1s t control function 279a. The interrelation of these control functions will become clearer during the description of the later figures.

VCSA 252 includes graphical user interface 281 for the video communication application in which the video images are presented, video preview control functions 283, video image settings 284, received video data 285, remote second participant control sharing UI 286, and received second participant selections 287. The specific operations and/or functions associated with the remote second participant control sharing UI 286 and received second participant selections 287 will be explain in greater details later. Graphical user interface 281 includes a video presentation screen, a video preview screen, and a settings screen.

Figure 3:
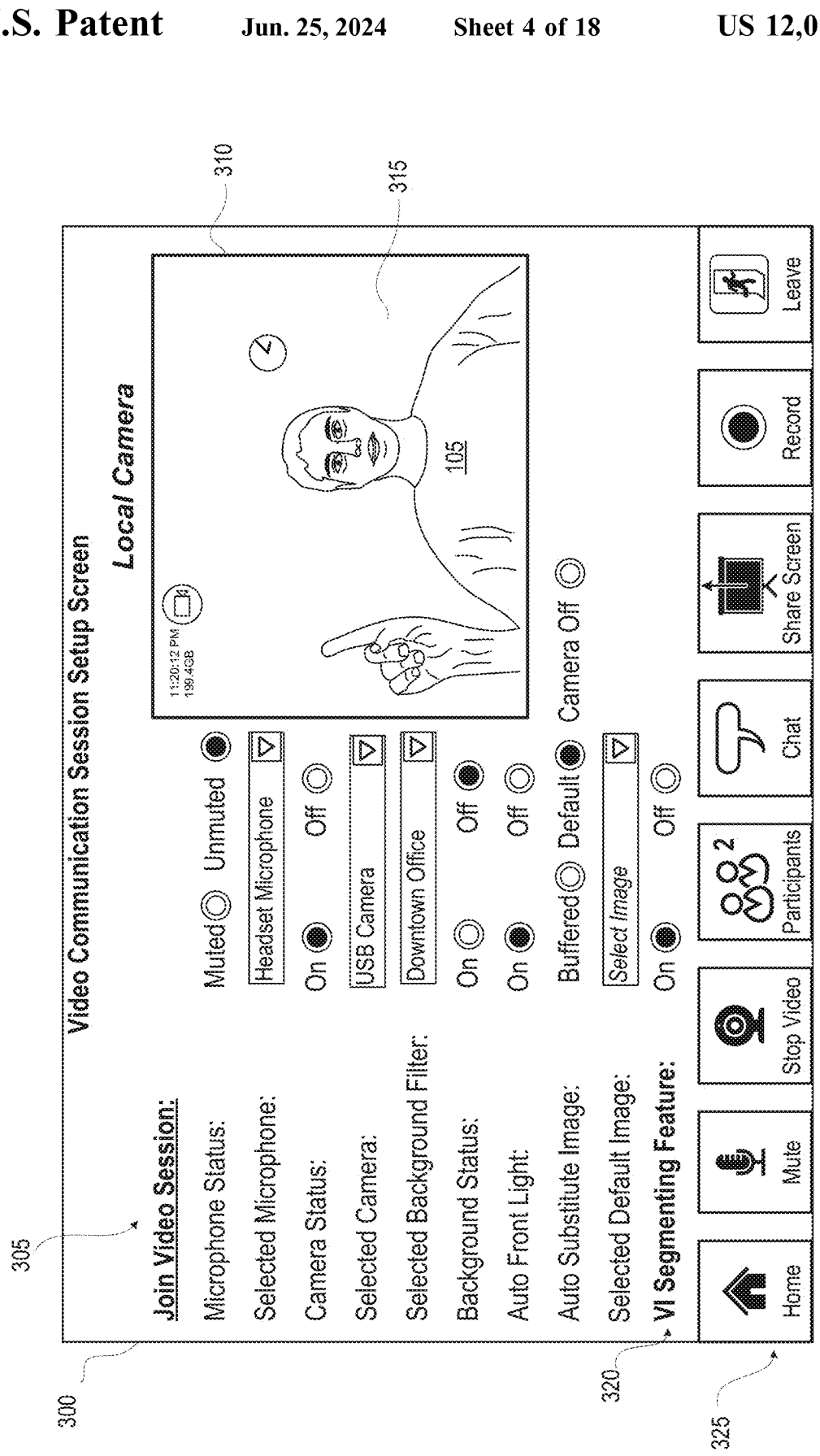
FIG. 3 depicts a settings user interface for a video communication application operating on the communication device and presenting a user selectable option for activating local video segmenting features of an artificial intelligence (AI) engine, in accordance with one or more embodiments.

FIG. 3 depicts a settings user interface for a video communication application operating on the communication device and presenting a user selectable option for activating local video segmenting features of an artificial intelligence (AI) engine, in accordance with one or more embodiments. Specifically, FIG. 3 presents an example settings screen 300 having a user interface 305 with a plurality of selectable options for the user to set up the video communications application on his/her device. Settings screen 300 includes a video image preview 310 which presents local participant 105 in a local scene 315 captured by one of the device's ICDs. Included within the selectable options is video image segmenting feature 320, which enables a user to activate (i.e., set to "on") the various functions provided by the different modules introduced above and described herein. Settings screen 300 also presents integrated communication session control options 325 that are visible to the user and selectable during the video communication session.

Figure 4A:
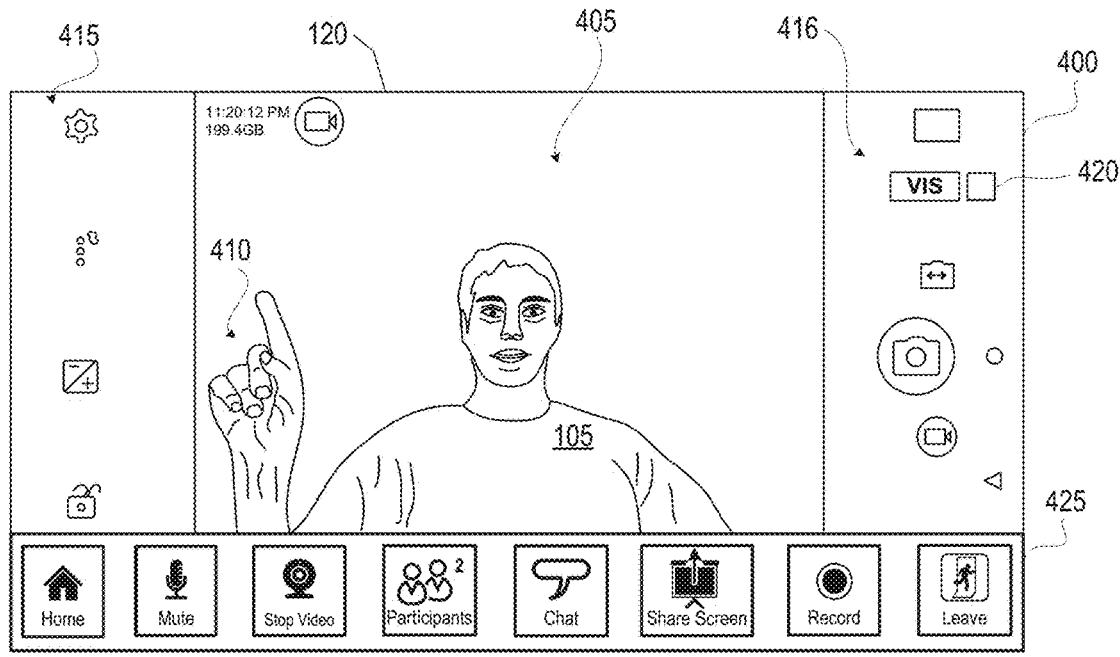
FIG. 4A provides an example illustration of a presentation by an electronic device of a capture video image of a local scene within a user interface of a video communication application, the user interface presenting a selectable segmenting feature, according to one or more embodiments.

As illustrated by FIG. 4A, activation of the functions described herein can also be triggered within a preview user interface. FIG. 4A provides an example illustration of a presentation by electronic device 110 of a capture video image of a local scene within a preview screen (or preview user interface) 400 of the example video communication application. The preview screen 400 is presented on display 120 when video communications application is activated or based on a user selection within a settings window of video communications application. Preview screen presents preview video image 405, which includes a mirrored view of local participant 105 with upper torso and face shown along with right hand 410, from which index finger is extended upwards and to the side. Preview screen 400 also presents two side panels 415, 416 with selectable settings components that can be physically selected by mouse, stylus, or keyboard selection. Within right side panel 416, a video image segmenting (VIS) function 420 is provided for user selection to activate (i.e., turn on) the VISCM implemented functions. A bottom control panel 425 is presented with different control options that can be selected by mouse, stylus, or keyboard selection.

Returning to FIG. 2, DOPM 254 includes AI engine 205', which provides the functions of demonstration object identification and reverse mirroring 288 to identify and manipulate demonstration object 289. According to one or more embodiments, and as illustrated and described herein, demonstration object 289 is a text-based demonstration object. However, it is appreciated that AI engine 205' can be similarly used to identify additional objects that may benefit from not being presented in its mirrored image. Additional details on the implementation of DOPM 254 will be provided later in the disclosure.

Communication module 256 enables communication device 110 to communicate with wireless communication network 132 and with other devices, such as second communication device 140, via one or more of audio, text, and video communications. Communication module 256 can support various communication sessions by communication device 110, such as audio communication sessions, video communication sessions, text communication sessions, communication device application communication sessions, or a dual/combined audio/text/video communication session.

CCM 296 includes camera parameters and settings 266, and AI engine 205, which further includes subject tracking 298 and camera selection modules 299. Other data 200 can also be provided within system memory, and the presented modules are for example only. Camera parameters and settings 266 can include fixed values such as focal length, maximum frame rate, and resolution and variable values such as light level values, directional values, and distances to objects within a camera FOV. Camera parameters and settings 266 are values and characteristics that can change during the operation of ICDs 232 and 233 to capture images by the cameras. Camera parameters and settings 266 can include various settings such as aperture, shutter speed, iso level, white balance, zoom level, directional settings (i.e., region of interest (ROI)), distance settings, focus and others. In one embodiment, camera parameters and settings 266 can be determined by either processor 202 or by ICD controller 234 or AI engine 205. In one embodiment, camera parameters and settings 266 can be adjusted by the local participants use of gestures that are captured by the ICD and associated with one or more of the virtual interface functions within the currently displayed action center. Similarly, other characteristics of video images can be determined and/or modified, such as light levels within the ROI, contrast, blur, etc., can be adjusted by the local participants use of gestures that are captured by the ICD and associated with one or more of the virtual interface functions within the currently displayed action center.

With the above components integrated within communication device 110, a first aspect of the disclosure presents a communication device 110 having at least one image capturing device (ICD) 233 that captures video (e.g., video image stream 291) of a local scene, an interface 264/265 by which the electronic device connects to a local display device 120, and a system memory 220 having stored thereon a video image segmentation and control module (VISCM) 250 comprising program instructions for spatially delineating video images into two or more segments that can be individually presented within or excluded from a video feed. The at least one processor 202 is communicatively coupled to the local display device 120, to each of the at least one image capturing device 132/133, and to the system memory 220. The at least one processor 202 executes or processor the program instructions of the VISCM 250, which causes the at least one processor 202 to perform a series of processes, which are illustrated by FIGS. 4A-4C and 5A-5B.

Figure 4B:
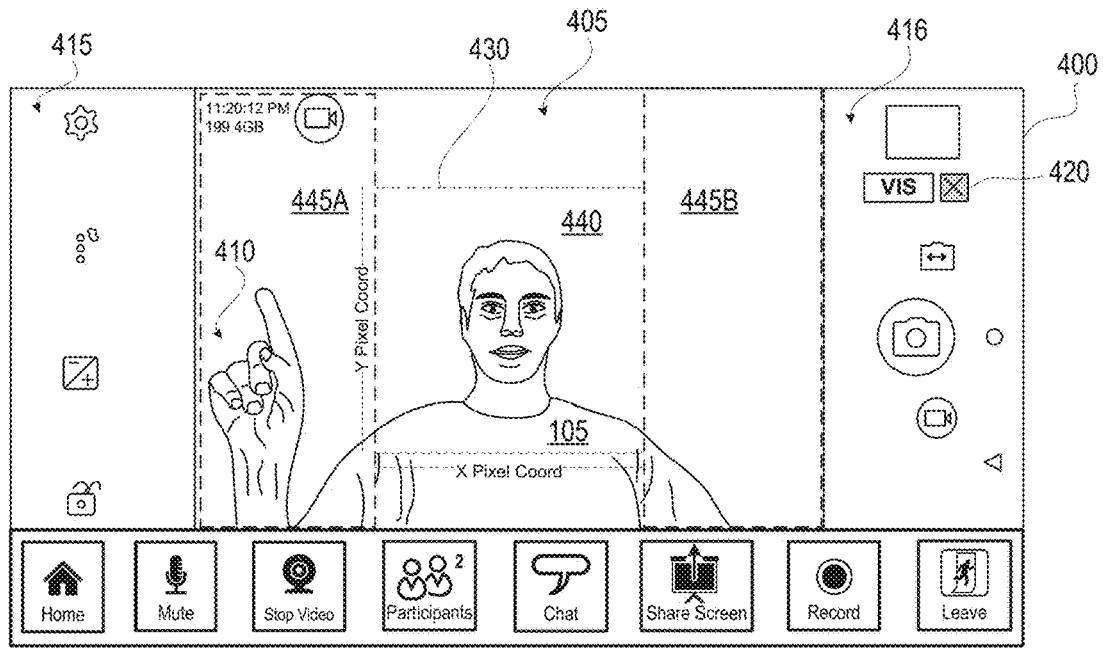
FIGS. 4B-4C illustrates the segmenting of a preview of captured video images into a plurality of segments, including a primary segment encompassing a primary region of interest (ROI) and individual, vertical and horizontal segments of the video image, with each vertical segment proximate to a selection object associated with one of the device settings and/or application settings, according to one or more embodiments.
Figure 4C:
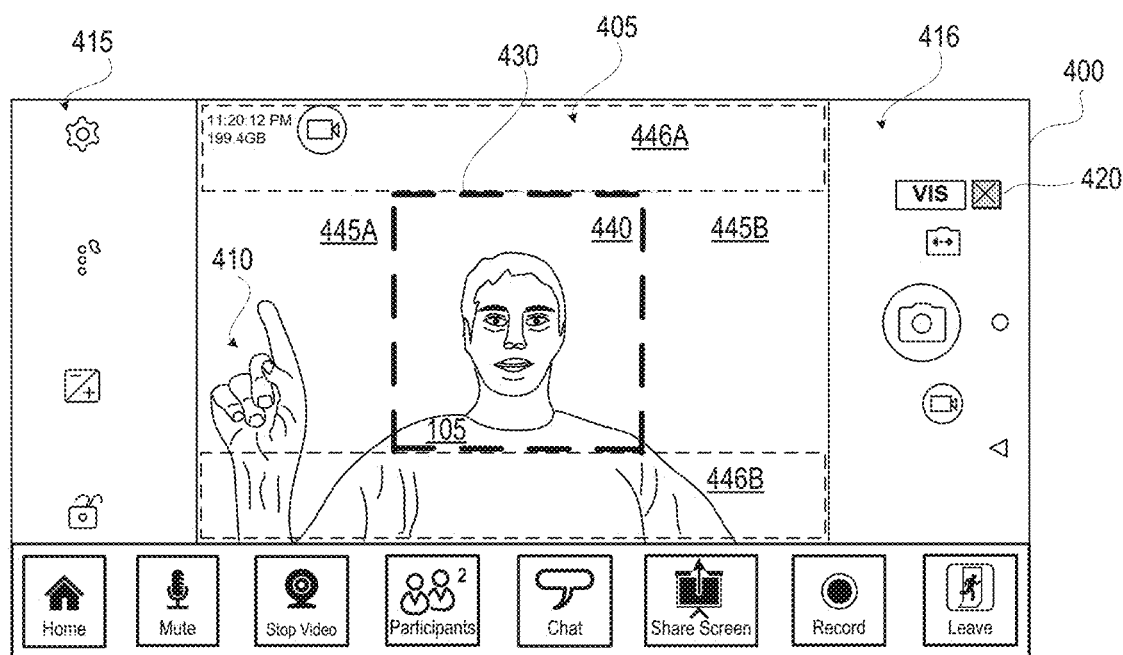

According to one aspect of the disclosure, the at least one processor 202 divides the video image into different segments in response to user selection of a video image segmenting function 420 before or during the video communication session 136. The segmentation feature is triggered is response to the activation occurring while the communication device 110 is communicatively connected to the display device 120 and is being utilized as a camera for capturing the video images to transmit to the video communication session 136. FIGS. 3 and 4B illustrate the VIS feature/function 320/420 set in an activated or on state. The at least one processor identifies a primary region of interest (ROI) 430 within a video image 405 captured by the at least one ICD 232/233, the primary ROI 430 being a smaller area than the video image 405. The primary ROI 430 is selected via artificial intelligence (e.g., AI engine 205), which incorporates within the primary ROI 430, a face and upper torso of a person (105) within a field of view of the at least one ICD 232/233, and excludes lower arms and hands (e.g., right hand 410) of the person, which are incorporated into one or more other segments. The processor 202 delineates the video image 405 into two or more segments, including a primary segment 440 that encompasses the primary ROI and at least a secondary segment 445A/445B. FIGS. 4B-4C illustrates the segmenting of a preview of captured video images 405 into a plurality of segments, including a primary segment (primary segment 440) encompassing a primary region of interest (ROI) 430 and individual, vertical right and left secondary segments 445A/445B (FIG. 4B) and horizontal top and bottom secondary segments 446A/446B (FIG. 4C) of the video image 405. As presented in FIG. 4B, each of the left and right vertical secondary segments 445A, 445B is proximate/adjacent to one of side panels 415/416 with selectable settings components associated with one of the device settings and/or application settings, according to one or more embodiments. As provided within FIGS. 4B and 4C and several other implementation figures presented herein, the processor is configured to delineate the captured video image into geometric shaped segments comprising rectangular segments. The segments comprise at least one of a top segment 446A, a bottom segment 446B, a left segment 445A, and a right segment 445B, arranged relative to the primary segment 440 as viewed in the figure. It is appreciated that the segments presented on the left and right of the figure appear reversed to the local participant.

Figure 5A:
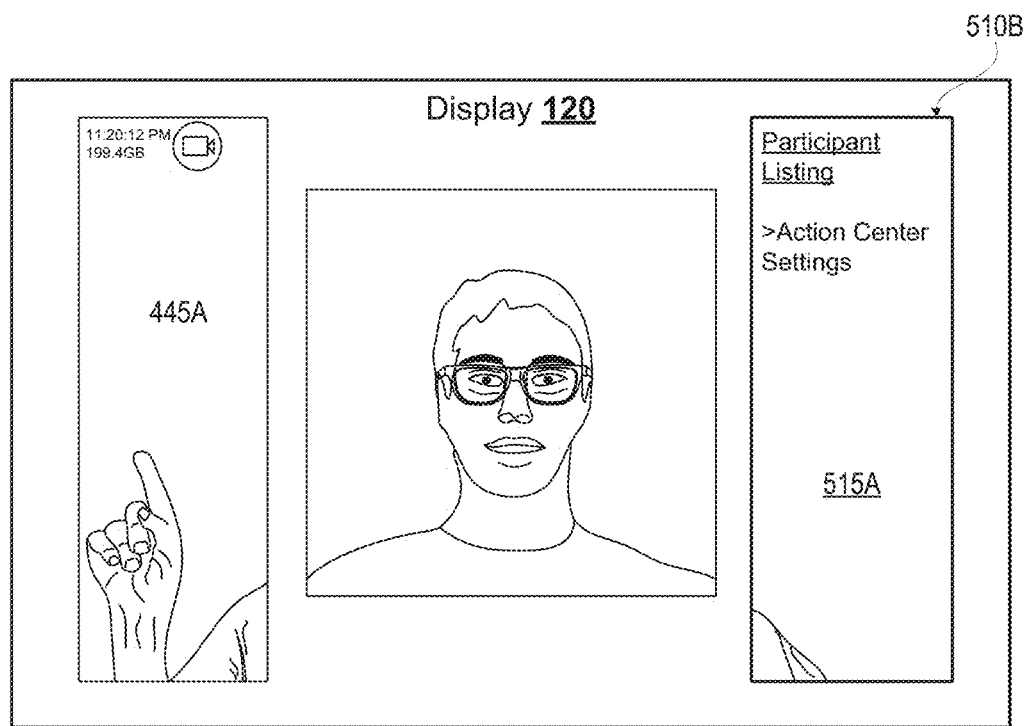
FIG. 5A illustrates individual, physically separated, vertical segments of the video image, surrounding a central, primary segment that includes the participant's upper torso and face as the ROI, with at least one vertical segment presenting an action center within selectable functions/features superimposed over the original side segment to enable selection via air gesturing at a normal spatial position of the participant's hand, according to one or more embodiments.
Figure 5B:
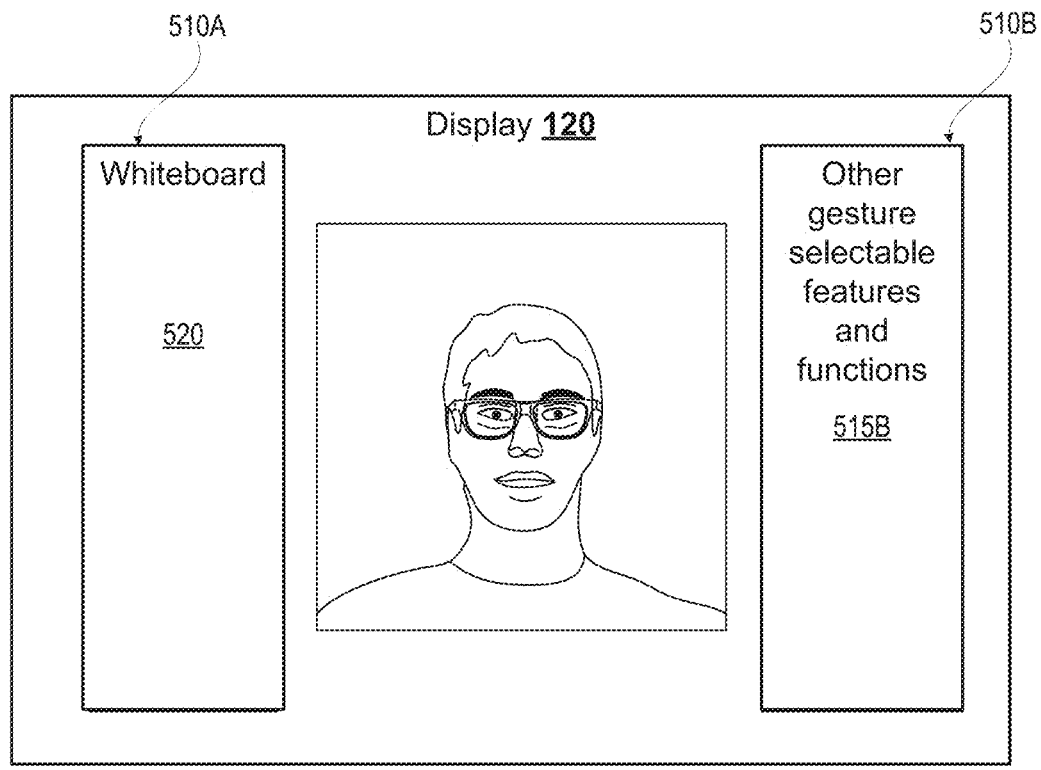
FIG. 5B illustrates individual, physically separated, vertical segments of the video image, surrounding a central, primary segment that includes the participant's user's upper torso and face, with at least one vertical segment presenting a virtual whiteboard that can be written on via air/finger gesturing, according to one or more embodiments.

Referring now to FIGS. 5A-5B and 6A-6C. FIG. 5A illustrates individual, physically separated, vertical segments of the video image, surrounding a central, primary segment that includes the participant's upper torso and face as the ROI, with at least one vertical segment presenting an action center within selectable functions/features superimposed over the original side segment to enable selection via air gesturing at a normal spatial position of the participant's hand, according to one or more embodiments. FIG. 5B illustrates individual, physically separated, vertical segments of the video image, surrounding a central, primary segment that includes the participant's user's upper torso and face, with at least one vertical segment presenting a virtual whiteboard that can be written on via air/finger gesturing, according to one or more embodiments.

In accordance with a first aspect of the disclosure, the processor 202 associates an action center 510A/510B having a virtual interface 515A with a location of the secondary segment 445A/445B in the video image 405. The virtual interface 515A includes at least one displayed feature that can be selected via one of air gestures and screen touches during presentation of the primary segment 440 of the video image 405. As shown by each of the figures, the processor 202 presents a preview with the delineated segments of the video image on the display device with at least the primary segment 440 and the one or more other segments (e.g., secondary segments 445A-445B) of the video image 405 and the virtual interface of the action center 510A/510B being visible within the local display device 120. In one or more embodiments, the processor 202 presents the virtual interface on the display device 120, visibly adjacent to or integrated as an overlay on top of (i.e., to at least partially obscure) the closest secondary segment. As an example, FIG. 5A provides a right action center 510B with participant listing settings user interface 515A that overlays the left vertical segment (445B) of the video image 405. FIG. 5B provides additional left and right action centers 510A, 510B respectively overlaying (i.e., replacing or making obscure/non-visible) the left and right secondary segments (not shown). Left action center 510A incorporates a whiteboard 520 that can be shared with other participants to the video communication session. Right action center 510B provides a UI 515B that provides other gesture-selectable features and functions. With whiteboard 520 (FIG. 5B) presented at/above/adjacent to the location of hand 410 and specifically the extended digit being used as a gesturing tool and writing tool, local participant 105 can create images (text, drawings, etc.) on whiteboard 520 by gesturing the words or outlining images with the extended digit. AI engine 205 recognizes the gesturing with the right hand 410 and associates the gesturing movement with writing on the whiteboard 520. The AI engine determines, from camera detected hand gestures/inputs 295A, the particular written content being presented by the hand movements, perhaps with reference to the gesture identifying/interpreting database 295B. The processor 202 then generates the corresponding content on the surface of the whiteboard 520. The processor selectively transmits a corresponding action center overlayed with the virtual whiteboard to enable cross sharing of content placed on the virtual whiteboard with each second device that receives the corresponding action center along with the primary segment.

To access the video communication session, the communication device 110 includes a communication interface (e.g., WCS 242) that enables the communication device 110 to communicatively connect with at least the second device 140. The processor is communicatively coupled to the communication interface, and the processor enables the communication device 110 to connect, via the communication interface, to the second device 140 via a video communication session 136 enabling exchange of video, audio, and other data with the second device 140. The processor selectively transmits, via the video communication session to the second device, only the content within the primary segment 440 of the video image 405 in response to the video image being locally presented as a segmented video image preview. The secondary segment(s) 445 and the associated virtual interface 515A (FIG. 5A) of the action center 510A (FIG. 5A) are only presented within the preview on the local display device 120.

In one or more embodiments, and as presented by FIG. 4C, the processor provides a visual indication of which segment is the primary segment 440 that is being shared with the second device. In the figure the visual indication is presented by a bold outline of primary segment 440. Other types of visual indication, such as color coding or shading or flashing of the primary segment 440, or blurring of the secondary segments 445, etc., can be utilized to inform the local participant of which segment of the video image 405 is the primary segment that is being transmitted to other participants on the video communication session.

FIGS. 6A-6C and 7A-7C presents pairing of the video image presented by a local communication device display and on a remote participant's display following segmentation of the video image and local participant selection of background features from the action center, according to one or more embodiments. With specific reference to FIGS. 6A-6C, the processor is further configured to detect, within a captured video image, one or more air gestures spatially proximate in preview screen to a visual on-screen location of a specific feature among the at least one feature within the virtual interface. The one or more air gestures represent a local participant selection of the specific feature or function. The at least one feature includes at least one of image capturing device configuration and settings, video image presentation settings, local device settings, and application settings for the video conference application that enables the video communication session with at least one second device. In response to identifying the selection of the specific feature, the processor enables a corresponding function associated with the specific feature. The enabling of the function can occur concurrently with a capturing and transmission of at least the primary segment of the video image to the video communication session.

In one or more embodiments, the processor 202 is further configured to identify selection of the specific feature, which activates a function that modifies one or more characteristics of at least the content within the primary segment of the video image. The processor applies the function to an original content within at least the primary segment 440 to generate a resulting modified content, and the processor locally presents and remotely transmits the resulting modified content within the primary segment 440 in place of original content.

Figure 6A:
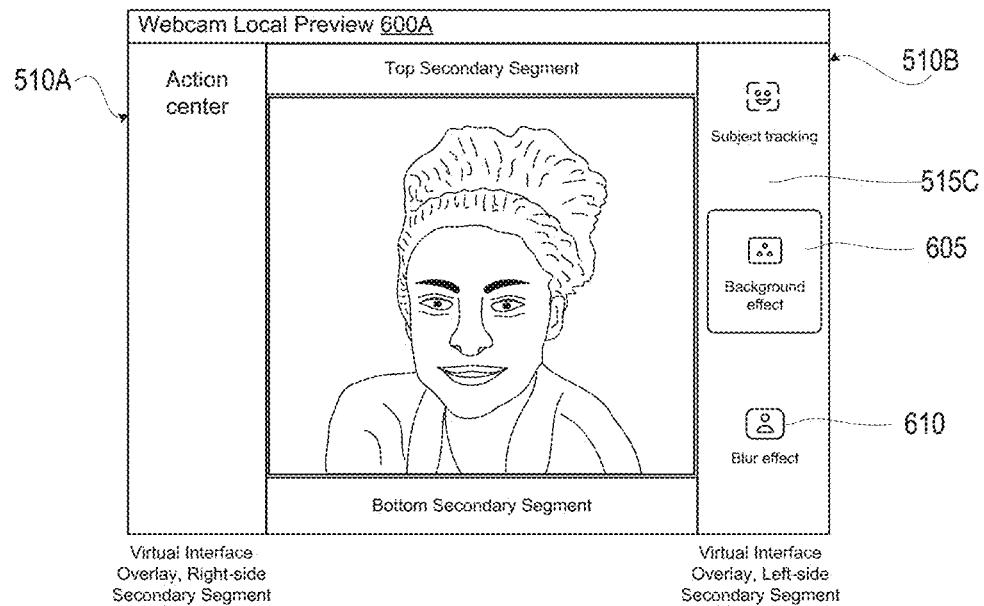
FIGS. 6A-6C and 7A-7C presents pairing of the video image presented by a local communication device display and on a remote participant's display following segmentation of the video image and local participant selection of background features from the action center, according to one or more embodiments.
Figure 7A:
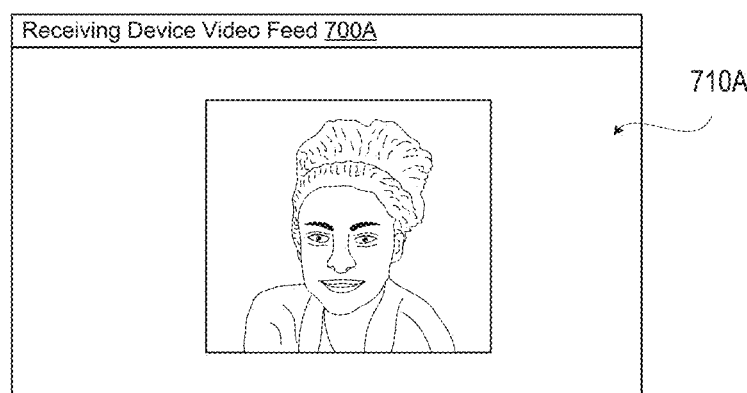
Figure 7B:
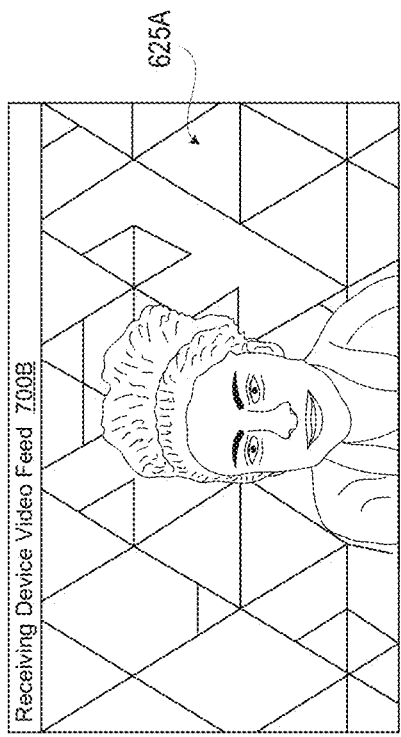
Figure 7C:
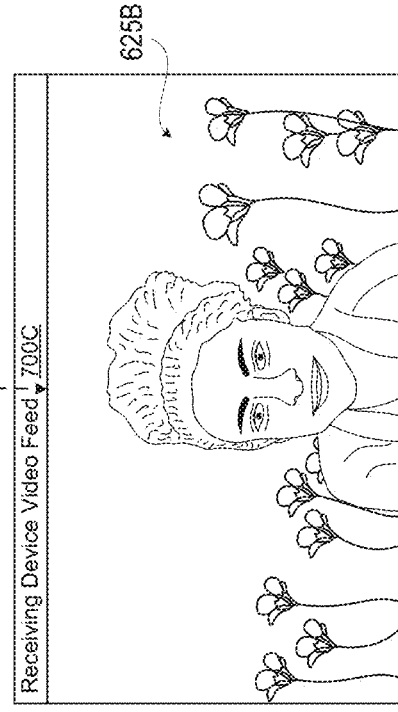
Figure 6B:
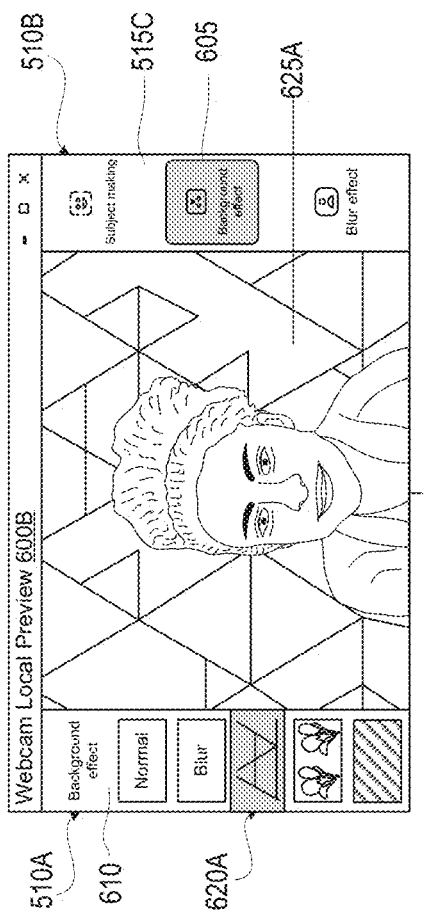
Figure 6C:
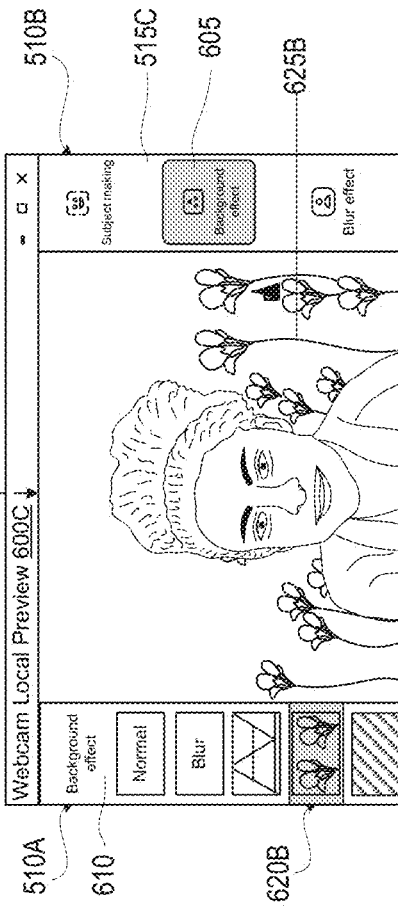

With reference to the illustrative examples of FIGS. 6A-6C and reference to paired illustrations of FIGS. 7A-7C, webcam local preview 600A provides user interface 515C of left action center 510A with gesture-selectable background image features, including background effect 605 and blur effect 610. In FIG. 6A, webcam local preview 600A presents primary segment 440 before any background features are applied, and the primary segment 440 is shared with its captured background within receiving device video feed 700A. Receiving device video feed 700A is displayed on the remote display device 710A of a second device 140 participating in the video communication session. Right user interface does not currently have any selected options; However, background effect 605 has been selected, as indicated by the darkened hue, by participant gesturing or hovering her right finger over the spatial area beneath which the virtual user interface is presented in the video image.

According to one aspect, because the preview is displaying a mirror image of the local participant, the participant selects items on the left action center with his right hand, and vice versa. The right hand appears adjacent to and/or within the same space as the left action center with preview image mirroring. In instances where no mirroring occurs in the preview image, the correct right or left hand and corresponding right or left action centers are aligned. In an alternate embodiment the selection can be is assumed to be based on the user's view of the mirrored image, and the selection can be further enhanced by allowing an icon to track the user's gestures on the preview screen so that the user can visibly see which action center the user is interfacing with. In one or more embodiments, the selection of right versus left placement of the action center can be a user preference, where the user can selectively assign the location of specific action centers within the settings menu of the video communication application. A left-handed user can thus reverse the relative placement of the action centers. Also, a user can move the action centers with the most commonly utilized features to within the best virtual location for capturing the users gesture inputs.

Referring back to the figures, FIG. 6B illustrates second view of webcam local preview 600B in which the left action center 510A (right side action center from the viewpoint of local participant 105) is now populated with selectable features for background effect 605. These features are made visible within left action center 510A in response to selection of background effect 605 within right action center 510B (left side from the viewpoint of local participant 105). Following participants selection (by gesturing) of a particular background 620A, processor 202 applies the selected background 625A to the video image. The primary segment of the video image is transmitted with the selected background 625A via video communication session to second device and displayed as receiving device video feed 700B with selected background 625A. Similarly, local participant selection of a next background 620B by air gestural inputs causes processor 202 to change the background to next selected background 625B presented in third view of webcam local preview 600C. Primary segment 440 of video image 405 is then transmitted to second device with next selected background 625B applied to receiving device video feed 700C.

Figure 8:
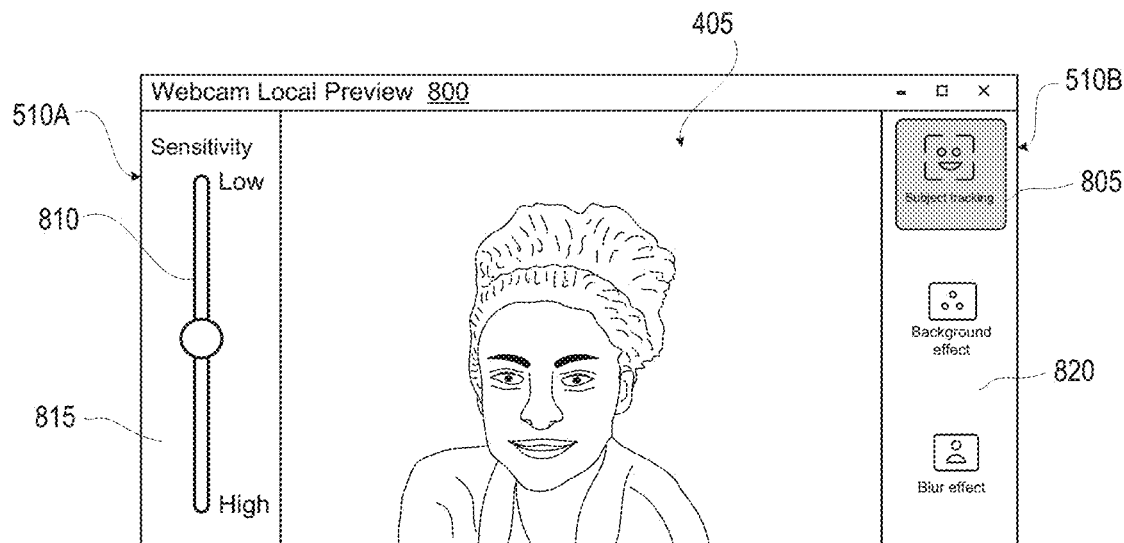
FIG. 8 illustrates a different set of example control functions, including a sliding bar selection, provided within an action center with virtual user interface objects overlaying a side segment, according to one or more embodiments.

FIG. 8 illustrates preview video image with a different set of example image control features within the virtual interface of the action centers of webcam local preview 800. Right action center 510B provides a virtual user interface that includes subject tracking 805. Left action center 510A includes a sliding bar selection 810 for setting the sensitivity of subject tracking. Each action center 510A/510B and corresponding selectable objects within respective virtual user interface 815, 820 overlay the secondary segments (445A-445B) of the locally captured video image 405.

Figure 9:
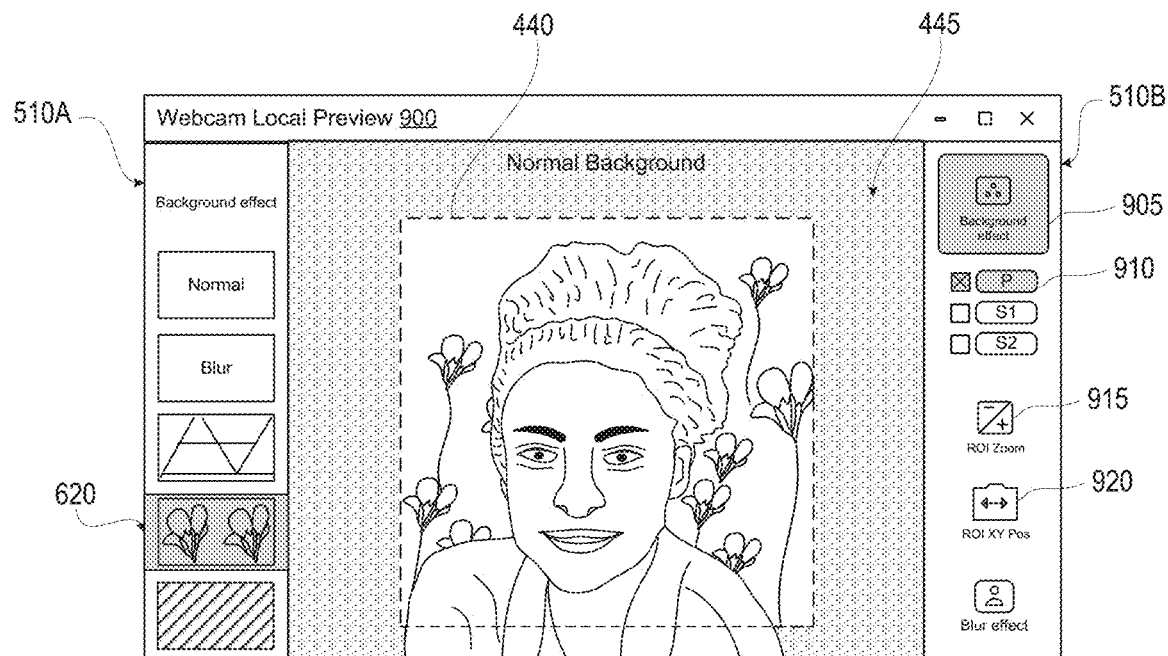
FIG. 9 illustrates an example of a feature for applying changes in the video image background effect to only the primary segment that is being transmitted to the video communication session, according to one or more embodiments.

FIG. 9 illustrates webcam local preview 900 providing examples of several features and sub-features for applying changes in the video image background effect to only the primary segment that is being transmitted to the video communication session, according to one or more embodiments. As illustrated, selection of the particular background 620 from left action center 510A applies a corresponding new/different background to the primary segment 440. Secondary segments 445 retain their normal background captured with the video image. As an extension of this feature, the application of the background effect can be granularly applied to the preview of each individual segment that is uniquely selected to be transmitted to a second participant. As illustrated within right action center 510B, virtual user interface may also provide a granular series of each delineated segment with an option to select that segment independent of the other segments available. As shown, in addition to selection of background effect feature 905, primary segment background effect option 910 is selected, as indicated by the X inside the selection box. This limits the background effect to being applied to only the primary segment 440. Additional selection boxes are provided for each of the other delineated secondary segments, none of which are shown selected. If local participant 105 checks the selection box associated with one or both of the two secondary segments 445, then the particular background 620 is applied to the selected secondary segment(s) as well. This feature enables the background effect to be applied to the primary segment 440 and a selected one or more secondary segment 445 that is also selected to be transmitted over the video communication session to the second device(s).

In one or more embodiments, selection of the secondary segments occurs independent of the application of a background effect. These embodiments enable the local participant to granularly/selectively choose which of the segments to transmit over the video communication session. Right action center 510B is shown having additional selectable features, including ROI zoom 915 and ROI XY Positioning 920, which enables a local participant (or a remote authorized second participant) to adjust a size and location of the primary segment 440. Once delineated on the user device, primary segment can thus be expanded, made smaller, shifted left or right, up or down, extended horizontally or vertically, etc.

Figure 10A:
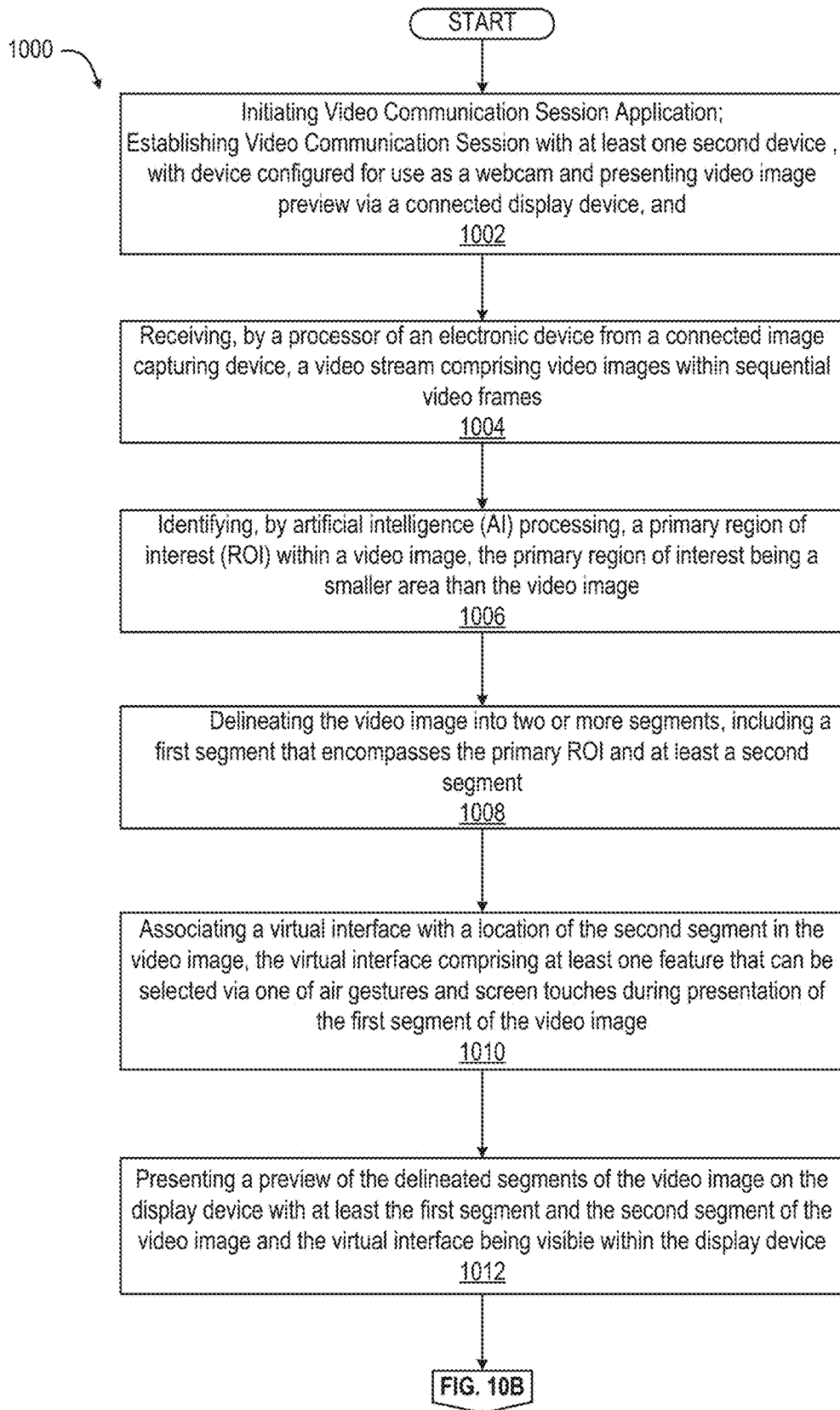
FIGS. 10A-10B (collectively FIG. 10) depict a flowchart of a method by which an electronic device performs segmenting of a locally captured video image presented within a preview of the video image that incorporates an action center with a virtual user interface for receipt of user selections via air gestures, according to one or more embodiments.
Figure 10B:
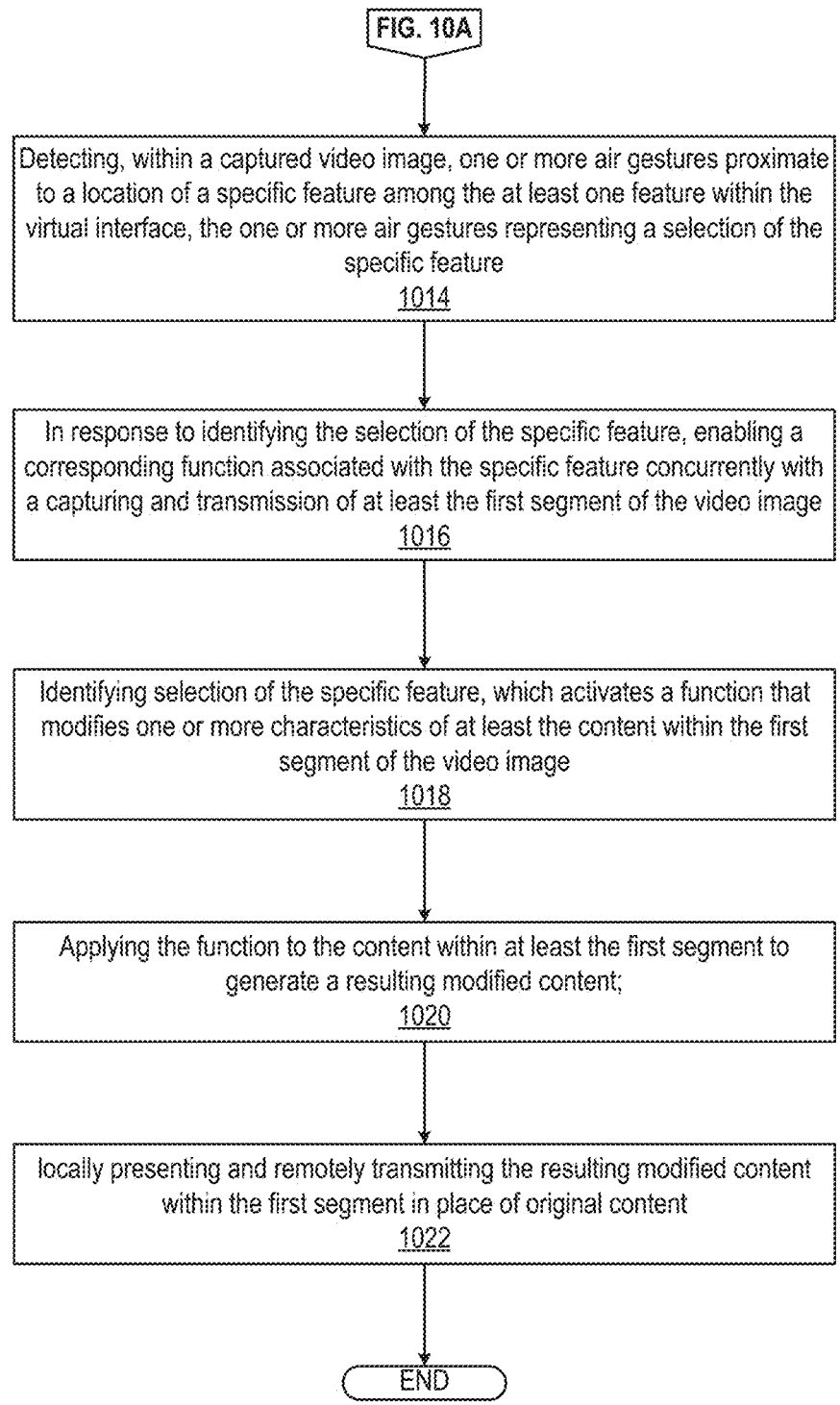

FIGS. 10A-10B (collectively FIG. 10) depict a flowchart of a method by which an communication device performs segmenting of a locally captured video image presented within a preview of the video image that incorporates an action center with a virtual user interface for receipt of user selections via air gestures, according to one or more embodiments. The descriptions of the various methods presented herein are provided with general reference to the specific components illustrated within the preceding figures. Specific components referenced in method 1000 and other methods described herein may be identical or similar to components of the same name used in describing the preceding figures. In one or more embodiments, the features of method 1000 and the other methods described herein can be provided by processor 202 of communication device 110 operating on program instructions from the various modules and applications presented in FIGS. 2A-2B. It is appreciated that certain of the described features of method 1000 and the other presented methods may be completed by AI engine 205, ICD controller 234, GPU 203c, etc., and these features are all generally described as being performed by processor 202 for simplicity.

With reference to FIG. 10A, method 1000 includes initiating a video communication session application and establishing a video communication session with at least one second device, while the communication device is configured to be used as a webcam and is presenting video image preview within the applications user interface via a connected display device (block 1002). Method 1000 includes receiving, by a processor of the communication device from an active/connected image capturing device, a video stream comprising video images within sequential video frames (block 1004). Method 1000 includes identifying, by artificial intelligence (AI) processing, a primary region of interest (ROI) within a video image, the primary region of interest being a smaller area than the video image (block 1006). Method 1000 includes delineating the video image into two or more segments, including a primary segment that encompasses the primary ROI and at least a secondary segment (block 1008). According to one or more embodiments, dividing the video image into different segments is performed in response to user selection of a video segmentation function at least before or during the video communication session, while the electronic device is communicatively connected to the display device and is being utilized as a camera for capturing the video images to transmit to the video communication session. Additionally, delineating the video image with a primary segment that encompasses the primary ROI includes incorporating within the primary segment, a face and upper torso of a person within a field of view of the at least one image capturing device, and incorporating lower arms and hands of the person into one or more other segments.

Method 1000 includes associating a virtual interface with a location of the secondary segment in the video image, the virtual interface including at least one feature that can be selected via one of air gestures and screen touches during presentation of the primary segment of the video image (block 1010). Method 1000 includes presenting a preview of the delineated segments of the video image on the display device with at least the primary segment and the secondary segment of the video image and the virtual interface being visible within the display device (block 1012).

In presenting the preview, method 1000 includes presenting, on the display device, a preview comprising the primary segment and the one or more other segments of the video image as delineated segments from each other and presenting the virtual interface on the display device, visibly adjacent to or integrated as an overlay on top of the secondary segment. In one or more embodiments, method 1000 can also include providing a visual indication of which segment is the primary segment that is being shared with the second device.

From block 1012, method 1000 transitions to decision block 1014 in FIG. 10B. At decision block 1014, method includes detecting, within a captured video image, one or more air gestures proximate to a location of a specific feature among the at least one feature within the virtual interface, the one or more air gestures representing a selection of the specific feature. The at least one feature includes at least one of image capturing device configuration and settings, video image presentation settings, local device settings, and application settings for a video conference application enabling a video communication session with at least the second device. Method 1000 includes in response to identifying the selection of the specific feature, enabling a corresponding function associated with the specific feature concurrently with a capturing and transmission of at least the primary segment of the video image (block 1016). Method 1000 includes identifying selection of the specific feature, which activates a function that modifies one or more characteristics of at least the content within the primary segment of the video image (block 1018). Method 1000 includes applying the function to the content within at least the primary segment to generate a resulting modified content (block 1020), and locally presenting and remotely transmitting the resulting modified content within the primary segment in place of original content (block 1022). Method then ends.

With ongoing reference to FIGS. 1-9, according to one aspect of the disclosure, the program instructions of the VISCM cause the at least one processor to associate control features of the virtual interface with at least one selected second device from among the plurality of second devices connected to the video communication session. The processor transmits, to each of the plurality of second devices, at least the primary segment for displaying at a corresponding second display of a second device during the video communication session, and the processor concurrently transmit, to each of the one or more selected second device, the control features of the virtual interface associated with the at least one selected second device to trigger the selected second device to present the virtual interface on the corresponding second display, concurrently with presenting the primary segment as parts of a combined video stream from the electronic device. Each of the plurality of second devices can be transmitted a different combination of segmented video images comprising at least the primary segment with zero or more virtual interfaces remotely presented on corresponding second displays for selection at a corresponding selected second device. As the originator of the video feed, the communication device 110 is referred to as an image stream transmitting (IST) device.

Figure 11:
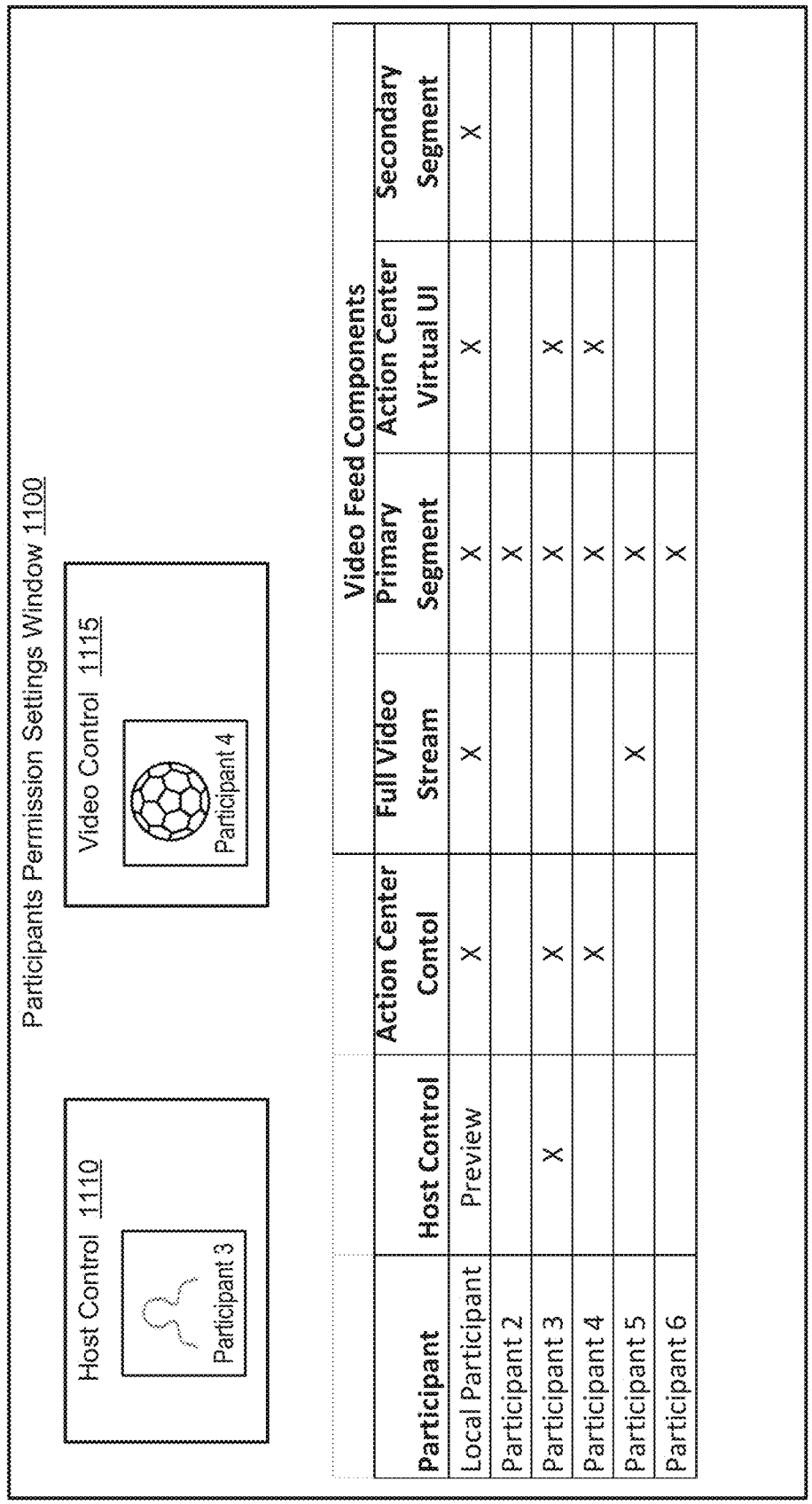
FIG. 11 illustrates an example selection table that is generated and presented on a display of a local participant to enable selection of which remote, second participant on the video communication session is provided access to the action center features that control/manipulate characteristics of the primary segment on the local device that is locally presented and/or presented within the video feed to other remote, second participants, according to one or more embodiments.

With reference now to FIG. 11, there is illustrated an example selection table that is generated and presented on a display device 120 of a local participant 105 to enable selection of which remote, second participant (140a-140n) on the video communication session 136 is provided access to the action center features that control/manipulate characteristics of the primary segment on the local display device, which characteristics are locally presented and/or presented within the video feed to other remote, second participants, according to one or more embodiments. In one or more embodiments, to associate the virtual interface with the at least one selected second device from among the plurality of second devices, the at least one processor 202 presents a conference participant permission settings window (PPSW) 1100 (see also UI 515A, FIG. 5A) that receives a selection ranging from between none to one or more virtual interfaces to provide to a particular second device 140 identified via an associated participant name (e.g., first column of table). In response to receiving the selections by local participant, processor 202 associates a selected one or more virtual interfaces with the particular second device. As shown within PPSW 1100, local participant is set to receive by default a preview of all of the segments and action centers with virtual UIs. Participants 2 and 6 are assigned only the primary segment. Participant 3 is identified as a host or cohost and provide action center control features. Participant 3 thus receives both primary segment and the action center virtual UI. Participant 4 is not provided host control but is provided with access to action center and thus also receives both the primary segment and the action center virtual UI. Participant 5 receives the full, unedited or unsegmented video feed.

From the above table example, each of the plurality of second devices that have not been assigned to receive an action center virtual interface, e.g., Participant 2 and 6, only receives the primary segment in a received video feed from the IST device. PPSW 1100 also includes host control inset 1110 and video control inset 1115, which respectively present a listing/indication of which participants have been given host control (with capability to modify the local video image for all participants), and a listing/indication of which participants have been given local video control (with capability to modify the local video image for just that participant and perhaps on the IST device (communication device 110).

Figure 12:
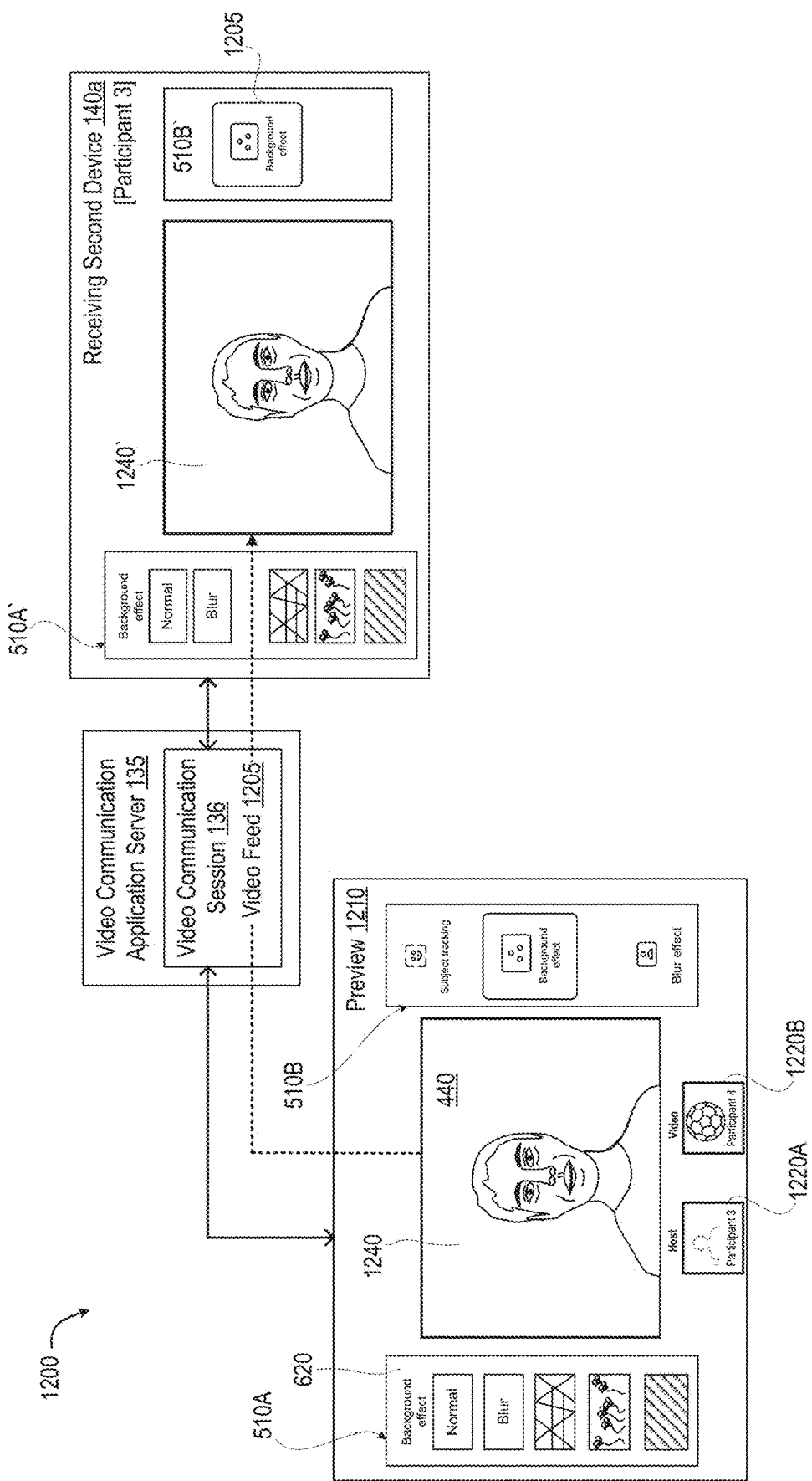
FIG. 12 illustrates components of a video communication environment in which a receiving second device receives a video feed from and image stream transmitting (IST) device along with virtual action centers that enable remote modification of the image feed, according to one or more embodiments.

FIG. 12 illustrates components of a video communication environment in which a receiving second device receives a video feed from and image stream transmitting (IST) device along with virtual action centers that enable remote modification of the image feed, according to one or more embodiments. Referring now to FIG. 12, there is illustrated a video communication environment 1200 in which a video communication application server 135 supports/enables a video communication session 136 that involves communicating a video feed 1205 from image stream transmitting (IST) device 110 to a receiving second device 140. The term IST device 110 is utilized to refer to the specific device that is transmitting an image stream with video images that are being viewed on the receiving second device 140. In the illustrative embodiments, IST device 110 is communication device 110 presented within the preceding figures. It is appreciated, however, that the term IST device can be applied to any one of the devices that are communicatively coupled to video communication session 136 and transmits a video image, which is shared with other devices connected to the video communication session. Importantly, both IST device 110 and second device 140 are configured with program instructions to enable the unique functions described herein.

According to the illustrative embodiment, IST device 110 presents preview image 1240 that is shared with second device 140 and is presented within second device display as received video images 1240'. IST device 110 also provides to at least two other second devices, identified as participant 3 1220A (provided with host-level video image modification privileges) and participant 4 1220B (provided with limited (or individual) video image modification privileges) the features provided by one or more action centers 510A-510B. Received virtual action centers 510A', 510B' are presented on the corresponding display device of the second device along with the received video image 1240'. By making selections and interfacing with the provided features of the provided action centers, the receiving second device 140a is able to remotely modify the video image 1240 at IST device 110 and on their corresponding local displays. Participant 3 with host privilege can further modify video image 1240 received by other second devices.

As shown by the participants permission settings window (PPSW) 1100 and also within video preview screen of IST device 110 each second device provided with action center functions are indicated via associated identifiers (1220a-1220b) on the local display. These identifiers can be provided within display participant listing feature (UI 515A, FIG. 5A), in one embodiment. The at least one processor presents, on the display device, a local preview window 1210 comprising a visual indication (e.g., 1100, 1220a-1220b, or 515A) of which of the one or more virtual interfaces are associated for transmission to each of the plurality of second devices designated to receive at least one virtual interface within a transmitted video stream. In one or more embodiments, as indicated by FIG. 12, the visual indication may persist on screen, highlighting the video image or name of the selected participants during the video communication session.

In one or more embodiments, the at least one processor detects selection of the particular second device 140 as an administrative device (e.g., a device having host-level privileges), auto-selects specific virtual interfaces having functions controllable by the administrative device, and transmits the auto-selected virtual interfaces concurrently with the primary segment to enable the virtual interfaces to be visually presented, concurrently with the primary segment, within the second display of the particular second device.

In one or more embodiments, the processor further enables the device to monitor for receipt of an indication of a remote selection or activation of at least one control function from within the virtual interfaces at the particular second device. In response to receiving an indication of a remote selection that is associated with a modification of a characteristic of the video images within the primary segment, the processor applies the modification to video image content within the primary segment at the electronic device and transmits the modification of the video image content to each of the plurality of second devices participating in the video communication session. In one embodiment, the broadcasting of the modified video image content is triggered only when the participant has host control, such as Participant 3 in PPSW 1100. Participant 4 is capable of also modifying the video image, but the modification only affects the primary segment content presented within the IST device display and/or the remote display of Participant 4.

Figure 13:
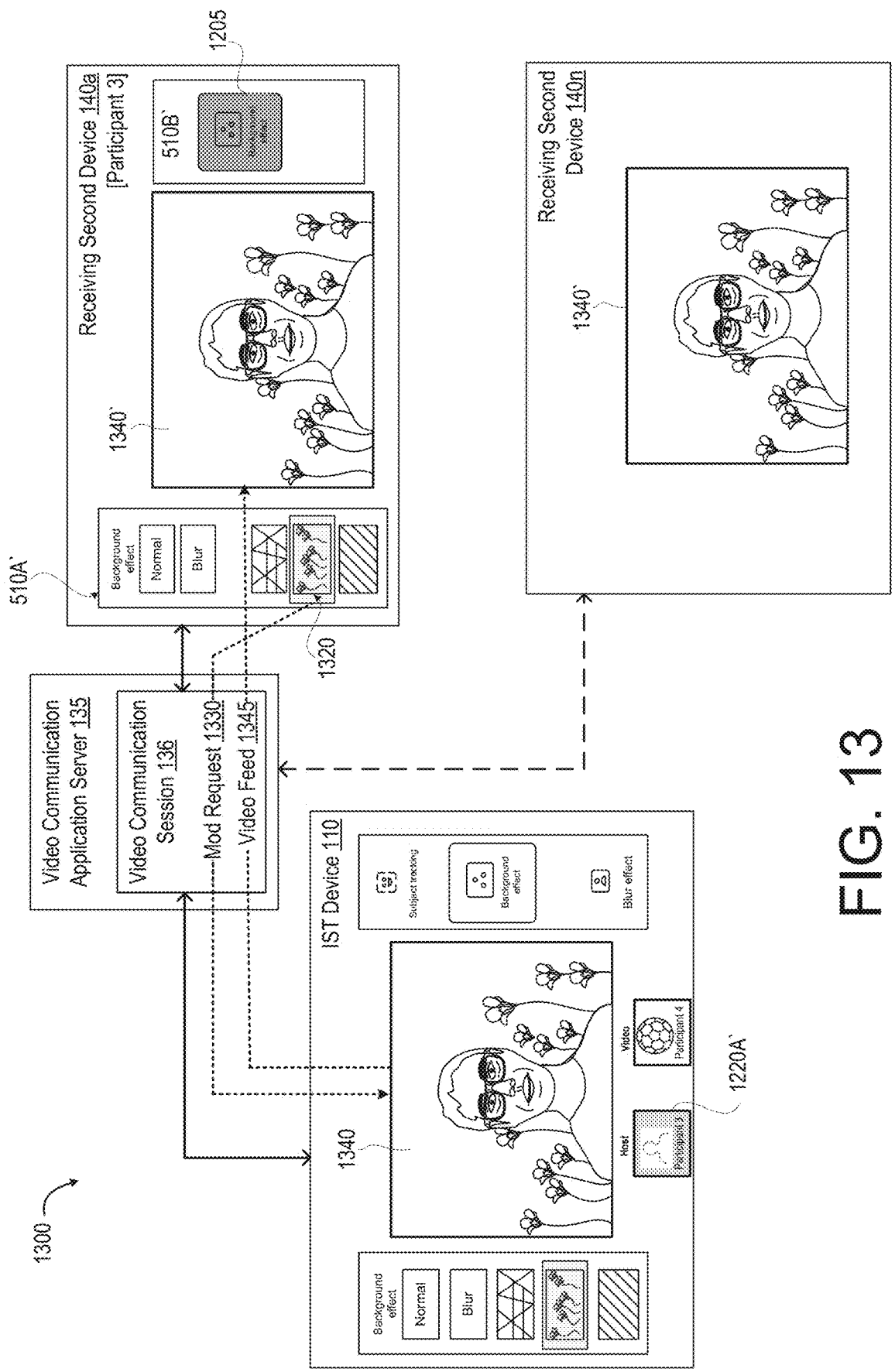
FIG. 13 illustrates components of a video communication environment in which a receiving second device remotely modifies the content and/or characteristics of at least the primary segment of a video image that is received from the IST device, according to one or more embodiments.

FIG. 13 provides another example video communication environment 1300 in which a receiving second device remotely modifies the content and/or characteristics of at least the primary segment of a video image that is received from the IST device 110. The components of FIG. 13 are similar to those of FIG. 12. However, in the present figure, participant/user of receiving second device 140a selects by gesturing or other input method a particular background effect 1320 from the received virtual action centers 510A' to apply to the received video image 1240' (FIG. 12). The selection at receiving second device 140a of the particular background effect 1320 is transmitted via the video communication session 136 as a background modification request 1330 to the IST device 110. The IST device 110 responds to receipt of the background modification request 1330 by applying the modification to the local video image 1240, generating modified video image 1340. Modified video image 1340 is then transmitted via video feed 1345 to each second device 140a-140n, which displays local versions of modified video image 1340'. According to the illustrative embodiment, Participant 3 1220A' is visually identified within IST device display as the source of the modification to video image 1340.

Figure 14A:
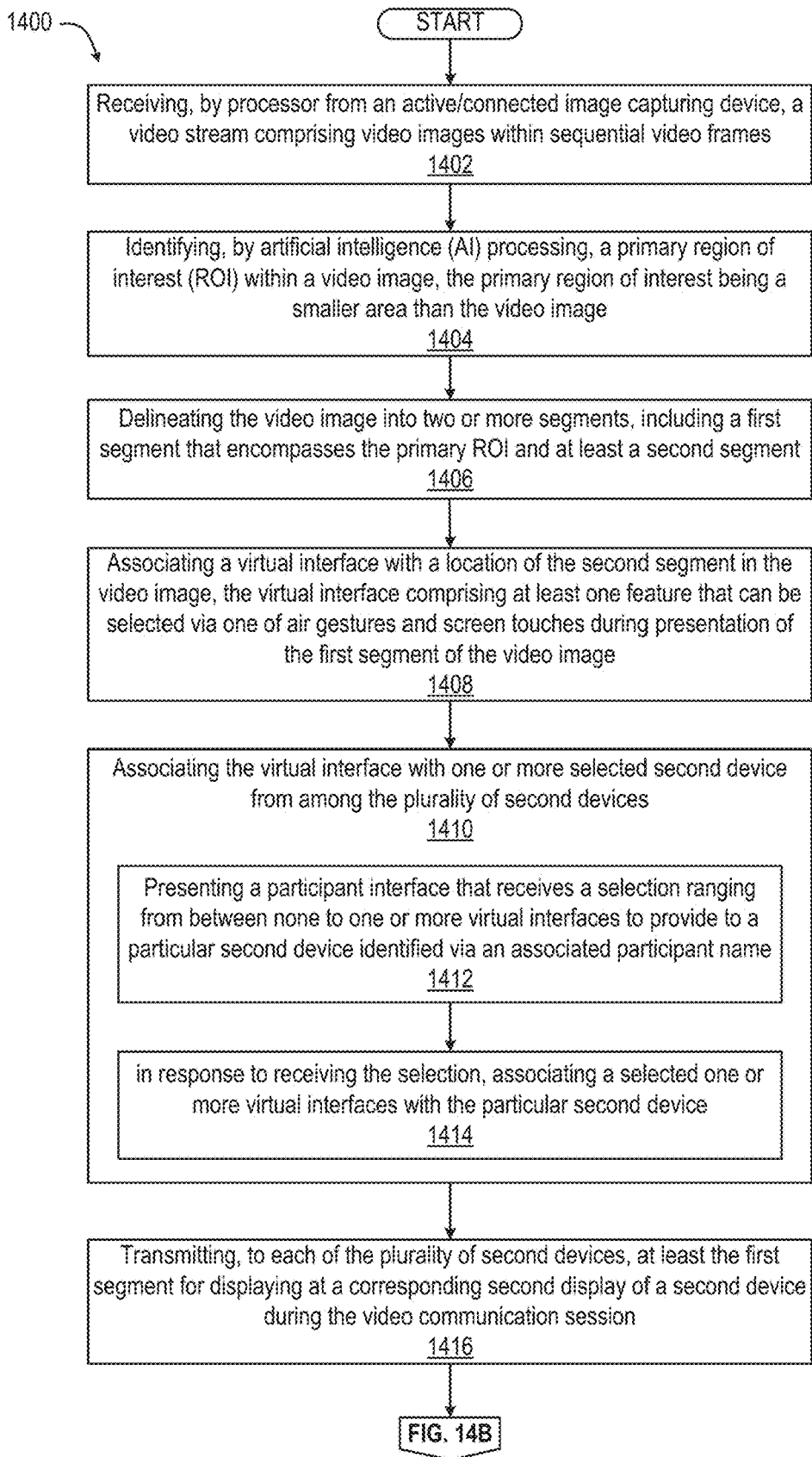
FIG. 14 (14A-14B) depicts a flowchart of a method by which an electronic device selectively transmits different combinations of primary segments of a segmented local video image and one or more virtual interfaces of action centers associated with modifying one or more characteristics of the primary segment and generating visible feedback of which second devices received the enhanced action center functions, according to one or more embodiments.
Figure 14B:
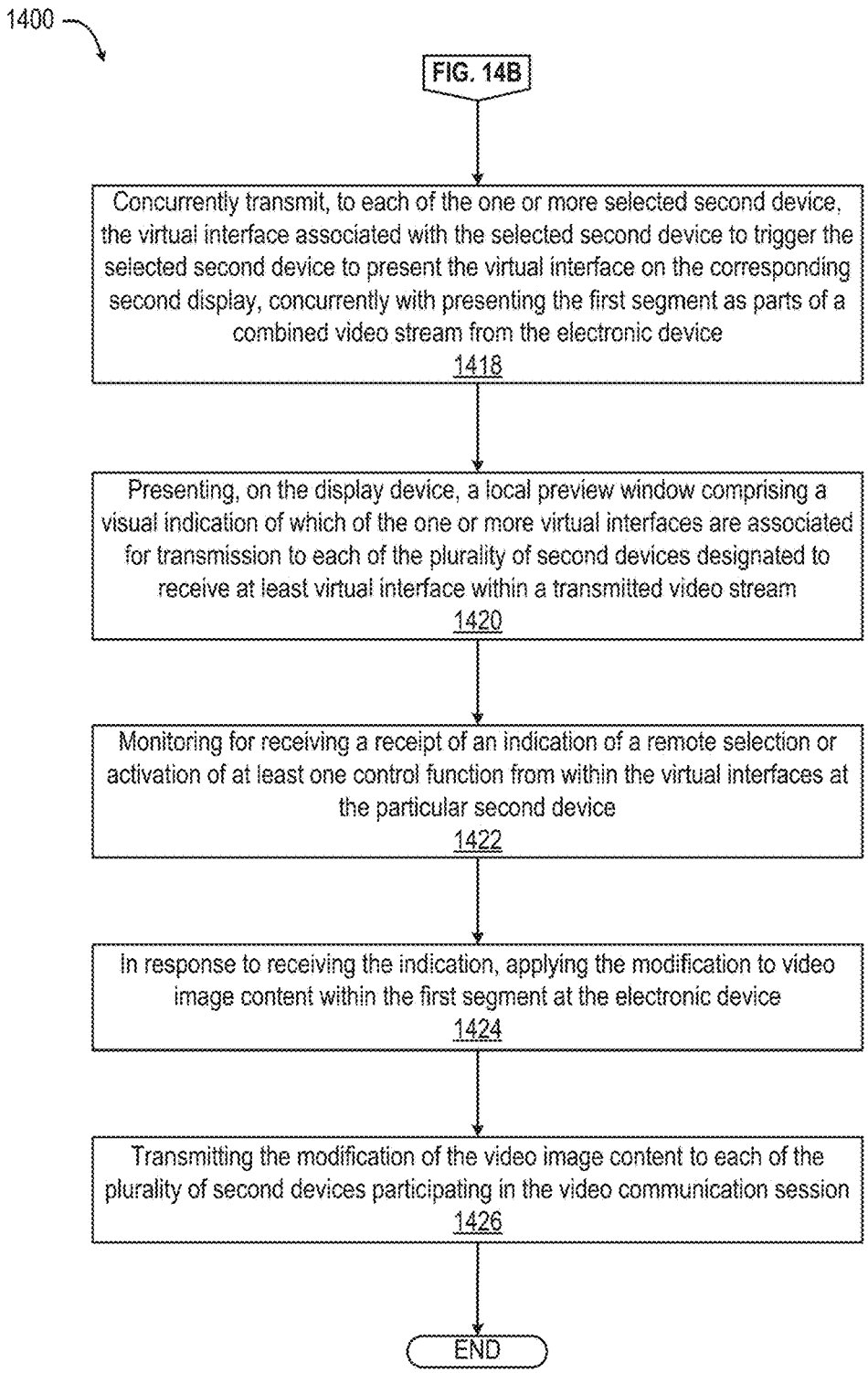

FIG. 14 (14A-14B) depicts a flowchart of a method by which a communication device selectively transmits different combinations of primary segments of a segmented local video image and one or more virtual interfaces of action centers associated with modifying one or more characteristics of the primary segment and generating visible feedback of which second devices received the enhanced action center functions, according to one or more embodiments. Method 1400 is described with reference to the preceding figures. Beginning at FIG. 14A, method 1400 includes receiving, by processor 202 from an active/connected image capturing device, a video stream comprising video images within sequential video frames (block 1402). Method 1400 includes identifying, by artificial intelligence (AI) processing, a primary region of interest (ROI) within a video image, the primary region of interest being a smaller area than the video image (block 1404). Method 1400 includes delineating the video image into two or more segments, including a primary segment that encompasses the primary ROI and at least a secondary segment (block 1406). Method 1400 includes associating a virtual interface with a location of the secondary segment in the video image, the virtual interface presenting at least one feature that can be selected via one of air gestures and screen touches during presentation of the primary segment of the video image (block 1408). Method 1400 includes associating the virtual interface with one or more selected second device from among the plurality of second devices (block 1410). According to one or more embodiments and as illustrated within method 1400, associating the virtual interface with the one or more selected second device from among the plurality of second devices includes presenting a participant settings interface (e.g., PPSW 1100) that receives a selection ranging from between none to one or more virtual interfaces to provide to a particular second device identified via an associated participant name (block 1412) and in response to receiving the selection, associating a selected one or more virtual interfaces with the particular second device (block 1414).

Method 1400 includes transmitting, to each of the plurality of second devices, at least the primary segment 440 for displaying at a corresponding second display of a second device during the video communication session (block 1416). Method 1400 then transitions to block 1418 in FIG. 14B. At block 1418, method 1400 includes concurrently transmitting, to each of the one or more selected second device, the virtual interface associated with the selected second device to trigger the selected second device to present the virtual interface on the corresponding second display, concurrently with presenting the primary segment as parts of a combined video stream from the electronic device. Accordingly, each of the plurality of second devices can be transmitted a different combination of segmented video images including at least the primary segment with zero or more virtual interfaces remotely presented on corresponding second displays for selection at a corresponding selected second device. Method then includes presenting, on the display device, a local preview window comprising a visual indication of which of the one or more virtual interfaces are associated for transmission to each of the plurality of second devices designated to receive at least virtual interface within a transmitted video stream (block 1420). In one or more implementations of the features of blocks 1410-1418, method 1400 can include detecting selection of the particular second device as an administrative device, auto-selecting specific virtual interfaces having functions controllable by the selected administrative device, and transmitting the auto-selected virtual interfaces concurrently with the primary segment to enable virtual interfaces to be visually presented within the second display of the particular second device concurrently with the primary segment.

Returning to FIG. 14B, method 1400 includes monitoring for receipt of an indication of a remote selection or activation of at least one control function from within the virtual interfaces at the particular second device (block 1422). Method 1400 further includes, in response to receiving an indication of a remote selection that is associated with a modification of a characteristic of the video images within the primary segment, applying the modification to video image content within the primary segment at the electronic device (block 1424) and transmitting the modification of the video image content to each of the plurality of second devices participating in the video communication session (block 1426). Method 1400 then ends.

According to another aspect of the disclosure, and is introduced within the description of FIG. 13, a second (communication) device 140 that receives a video stream from an image stream transmitting (IST) device 110 is provided with functionality that enables the receiving second communication device 140 to modify a received image stream based on permissions assigned to the second communication device 140) by the IST device 110. According to one or more embodiments, second devices 140a-140n can be similarly configured to perform the aforementioned features of video image segmenting, action center generation and presentation, transmission of primary segments along with participant-assigned action center features, which were described as being performed by communication device 110. Communication device 110 can thus serve as the receiving second device that receives a video feed from another one of the second devices that serves as the IST device. The device receiving the video feed also receives the one or more action centers with virtual user interface objects that can be selected to manipulate the video feed. Second communication device 140 includes at least one image capturing device that captures video of a local scene, a display device, and a communication interface that enables the communication device 110 to communicatively connect with and receive video data from an IST device 110 during a video communication session. Second communication device 140 also includes a memory having stored thereon a segmented video image control module (SVICM) enabling presentation and control of a received segmented video feed including a primary segment and at least one secondary segment presenting a virtual control interface (e.g., an action center 510). Second communication device 140 includes at least one processor communicatively coupled to the display device, the communication interface, each of the at least one image capturing device, and to the memory. The at least one processor processes program code of the SVICM, which enables the processor to receive the segmented video stream with the primary segment presenting a region of interest captured at the IST device and the at least one secondary segment, each presenting a respective virtual control interface. The at least one processor presents, on the display device, a control enabling view of the segmented video stream comprising both the primary segment and the at least one secondary segment with the respective virtual control interface, each virtual control interface further presenting at least one selectable feature that can be selected by an input from among a screen touch and an air gesture during local presentation of the received segmented video stream. The processor monitors for movement captured by the at least one image capturing device that is indicative of the input occurring within a spatial location proximate to the selectable feature within a corresponding secondary segment. In response to detecting the input, the processor identifies a function associated with the selectable feature and activates the function to affect one or more characteristics of a video image presented within the primary segment. The selectable feature modifies at least one characteristic of content visibly presented within the primary segment, and the processor modifies the characteristic of the content in response to the input.

In one embodiment, the processor modifies the characteristic of the content at the IST device by transmitting a corresponding content settings update indication to the IST device via the video communication session. Also, the processor modifies the characteristic of the content for at least one of: the electronic device only; and all connected devices participating in the video communication session that receive the primary segment from the IST device. The function modifies one or more of: (i) characteristics of the content within the primary segment, (ii) characteristics of the primary segment, (iii) characteristics of the video communication session, (iv) a local device setting, and (v) a setting of the IST device.

In one embodiment, one of the secondary segments includes a virtual white board and the input activates the white board for content sharing between the electronic device and at least the IST device. In one or more embodiments, the received segmented video stream comprises a preview window identifying which segments from among the primary segment and the at least one secondary segment are received by each second device connected to the video communication session that receives video content from the IST device.

Figure 15:
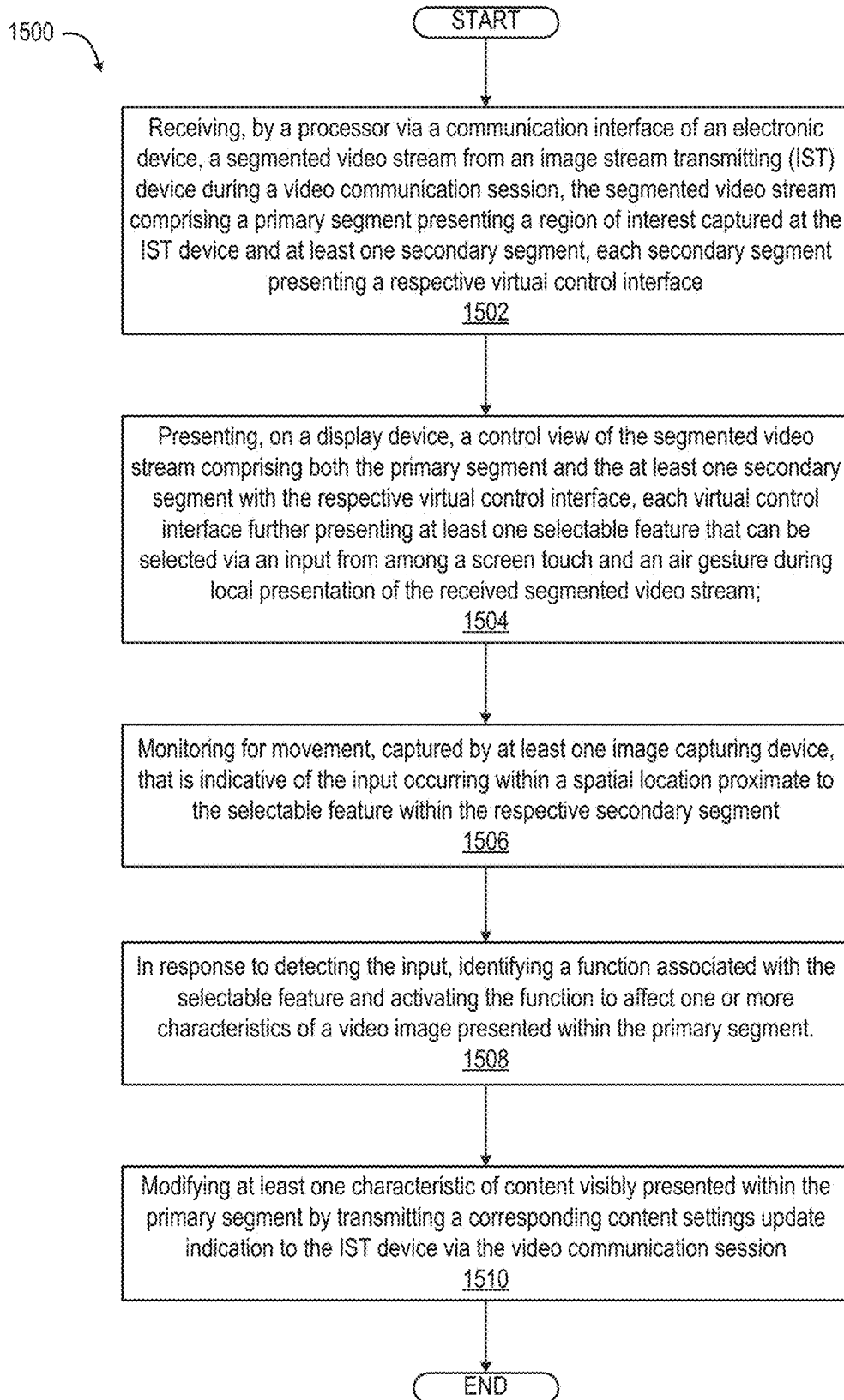
FIG. 15 depicts a flowchart of a method by which an electronic device receives, via a video communication session, a video feed with a segmented video image from an IST device and performs control operations on one or more characteristics of the video image at the IST device using a received and displayed virtual interface of an action center associated with the received video image, according to one or more embodiments.

FIG. 15 depicts a flowchart of a method 1500 by which an electronic device receives, via a video communication session, a video feed with a segmented video image from an IST device and performs control operations on one or more characteristics of the video image at the IST device using a received and displayed virtual interface of an action center associated with the received video image, according to one or more embodiments. Method 1500 includes receiving, by a processor via a communication interface of an electronic device, a segmented video stream from an image stream transmitting (IST) device during a video communication session, the segmented video stream comprising a primary segment presenting a region of interest captured at the IST device and at least one secondary segment, each secondary segment presenting a respective virtual control interface (block 1502). Method 1500 includes presenting, on a display device, a control view of the segmented video stream comprising both the primary segment and the at least one secondary segment with the respective virtual control interface, each virtual control interface further presenting at least one selectable feature that can be selected via an input from among a screen touch and an air gesture during local presentation of the received segmented video stream (block 1504). Method 1500 includes monitoring for movement, captured by at least one image capturing device, that is indicative of the input occurring within a spatial location proximate to the selectable feature within the respective secondary segment (block 1506). Method 1500 includes in response to detecting the input, identifying a function associated with the selectable feature and activating the function to affect one or more characteristics of a video image presented within the primary segment (block 1508). The selectable feature modifies at least one characteristic of content visibly presented within the primary segment. Method 1500 includes modifying the characteristic of the content at the IST device by transmitting a corresponding content settings update indication to the IST device via the video communication session (block 1510).

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
at least one image capturing device that captures a video stream of a local scene;
an interface by which the electronic device connects to a display device;
a communication interface that enables the electronic device to communicatively connect and exchange video data with a plurality of second devices during a video communication session;
a memory having stored thereon a video image segmentation and control module (VISCM) comprising program instructions for spatially delineating video images into two or more segments that can be individually presented within or excluded from a video feed; and
at least one processor communicatively coupled to the display device, to each of the at least one image capturing device, to the communication interface, and to the memory, the at least one processor executing the program instructions of the VISCM to cause the at least one processor to:
identify a primary region of interest (ROI) within a video image captured by the at least one image capturing device, the primary region of interest being a smaller area than the video image;
delineate the video image into two or more segments, including a primary segment that encompasses the primary ROI and at least one secondary segment;
present an action center with a virtual interface within a location of one or more of the at least one secondary segment in the video image, the virtual interface presenting at least one feature that can be selected via one of air gestures and screen touches during presentation of the primary segment of the video image;
assign control features of the virtual interface with at least one selected second device from among the plurality of second devices;
transmit, to each of the plurality of second devices, at least the primary segment for displaying at a second display of a corresponding second device during the video communication session; and concurrently transmit, to each of the at least one selected second device, the control features of the virtual interface assigned to the at least one selected second device to trigger the at least one selected second device to present the virtual interface on the corresponding second display, concurrently with presenting the primary segment as parts of a combined video stream from the electronic device, wherein each of the plurality of second devices can be transmitted a different combination of segmented video images comprising at least the primary segment with zero or more virtual interfaces remotely presented on a respective second display for selection at a respective at least one selected second device.

2. The electronic device of claim 1, wherein each of the plurality of second devices that have not been assigned a virtual interface by the communication device only receives the primary segment in a received video feed.

3. The electronic device of claim 1, wherein to associate the virtual interface with the at least one selected second device from among the plurality of second devices, the at least one processor:
presents a conference participant interface that receives a selection ranging from between none to one or more virtual interfaces to provide to a particular second device identified via an associated participant name; and
in response to receiving the selection, associates a selected one or more virtual interfaces with the particular second device.

4. The electronic device of claim 3, wherein the at least one processor presents, on the display device, a local preview window comprising a visual indication of which of the one or more virtual interfaces are associated for transmission to each of the plurality of second devices designated to receive at least one virtual interface within a transmitted video stream.

5. The electronic device of claim 3, wherein the at least one processor:
detects selection of the particular second device as an administrative device;
auto-select specific virtual interfaces having functions controllable by the administrative device; and
transmit the auto-selected virtual interfaces concurrently with the primary segment to enable the control features of the virtual interfaces to be visually presented, concurrently with the primary segment, within the second display of the particular second device.

6. The electronic device of claim 3, where the processor further enables the device to:
monitor for receipt of an indication of a remote selection or activation of at least one control function from within the virtual interfaces at the particular second device; and
in response to receiving an indication of a remote selection that is associated with a modification of a characteristic of the video images within the primary segment, apply the modification to video image content within the primary segment at the electronic device and transmit the modification of the video image content to each of the plurality of second devices participating in the video communication session.

7. The electronic device of claim 1, wherein the processor:
in response to detection of multiple potential subjects within a received video image:
identify via artificial intelligence, a primary subject from among the multiple potential subjects; and
align the primary segment with an ROI that incorporates the primary subject.

8. The electronic device of claim 1, wherein the virtual interface comprises a window presented as an overlay in place of one of the at least one other segment, the virtual interface overlaying an original content within a location of the other segment.

9. The electronic device of claim 8, wherein the virtual interface comprises a virtual white board overlaying one of the secondary segments, and the processor selectively transmits a corresponding secondary segment overlayed with the virtual white board to enable cross sharing of content placed on the virtual white board with each second device that receives the corresponding secondary segment along with the primary segment.

10. A method comprising:
receiving, by a processor of an electronic device from a connected image capturing device, a video stream comprising video images within sequential video frames;
identifying, by artificial intelligence (AI) processing, a primary region of interest (ROI) within a video image, the primary region of interest being a smaller area than the video image;
delineating the video image into two or more segments, including a primary segment that encompasses the primary ROI and at least a secondary segment;
associating an action center with a virtual interface within a location of the secondary segment in the video image, the virtual interface presenting at least one feature that can be selected via one of air gestures and screen touches during presentation of the primary segment of the video image;
assigning control features of the virtual interface to at least one selected second device from among a plurality of second devices;
transmitting, to each of the plurality of second devices, at least the primary segment for displaying at a second display of a corresponding second device during a video communication session; and
concurrently transmitting, to each of the at least one selected second device, the control features of the virtual interface associated with the at least one selected second device to trigger the at least one selected second device to present the virtual interface on the second display, concurrently with presenting the primary segment as parts of a combined video stream from the electronic device, wherein each of the plurality of second devices can be transmitted a different combination of segmented video images comprising at least the primary segment with zero or more virtual interfaces remotely presented on the respective second display for selection at a respective at least one selected second device.

11. The method of claim 10, wherein associating the virtual interface with the at least one selected second device from among the plurality of second devices comprises:
presenting a conference participant interface that receives a selection ranging from between none to one or more virtual interfaces to provide to a particular second device identified via an associated participant name;
in response to receiving the selection, associating a selected one or more virtual interfaces with the particular second device; and presenting, on the display device, a local preview window comprising a visual indication of which of the one or more virtual interfaces are associated for transmission to each of the plurality of second devices designated to receive at least one virtual interface within a transmitted video stream.

12. The method of claim 11, further comprising:
detecting selection of the particular second device as an administrative device;
auto-selecting specific virtual interfaces having functions controllable by the selected administrative device; and
transmitting the auto-selected virtual interfaces concurrently with the primary segment to enable virtual interfaces to be visually presented within the second display of the particular second device concurrently with the primary segment.

13. The method of claim 12, further comprising:
monitoring for receipt of an indication of a remote selection or activation of at least one control function from within the virtual interfaces at the particular second device; and
in response to receiving an indication of a remote selection that is associated with a modification of a characteristic of the video images within the primary segment:
applying the modification to video image content within the primary segment at the electronic device; and transmitting the modification of the video image content to each of the plurality of second devices participating in the video communication session.

14. The method of claim 10, further comprising:
in response to detection of multiple potential subjects within a received video image:
identify via artificial intelligence, a primary subject from among the multiple potential subjects; and
align the primary segment with an ROI that incorporates the primary subject.

15. The method of claim 10, wherein:
the virtual interface comprises a window presented as an overlay in place of one of the at least one secondary segment, the virtual interface overlaying an original content within a location of the other segment; and
in response to the virtual interface comprising a virtual white board overlaying one of the secondary segments, the method comprises selectively transmitting a corresponding secondary segment overlayed with the virtual white board to enable cross sharing of content placed on the virtual white board with each selected second device that receives the corresponding secondary segment along with the primary segment.

16. A computer program product comprising a non-transitory computer readable medium having program instructions that when executed by a processor of an electronic device connected to a display device enables the electronic device to perform the functions of:
receiving, by the processor from a connected image capturing device, a video stream comprising video images within sequential video frames;
identifying, by artificial intelligence (AI) processing, a primary region of interest (ROI) within a video image, the primary region of interest being a smaller area than the video image;
delineating the video image into two or more segments, including a primary segment that encompasses the primary ROI and at least a secondary segment;
associating an action center with a virtual interface within a location of the secondary segment in the video image, the virtual interface presenting at least one feature that can be selected via one of air gestures and screen touches during presentation of the primary segment of the video image;
assigning control features of the virtual interface to at least one selected second device from among a plurality of second devices;
transmitting, to each of the plurality of second devices, at least the primary segment for displaying at a second display of a corresponding second device during a video communication session; and
concurrently transmitting, to each of the at least one selected second device, the control features of the virtual interface assigned to the at least one selected second device to trigger the at least one selected second device to present the virtual interface on the second display device, concurrently with presenting the primary segment as parts of a combined video stream from the electronic device, wherein each of the plurality of second devices can be transmitted a different combination of segmented video images comprising at least the primary segment with zero or more virtual interfaces remotely presented on a respective second display for selection at a respective at least one selected second device.

17. The computer program product of claim 16, wherein the program instructions for associating the virtual interface with the at least one selected second device from among the plurality of second devices comprises instructions for enabling the processor to perform the functions of:
presenting a conference participant interface that receives a selection ranging from between none to one or more virtual interfaces to provide to a particular second device identified via an associated participant name;
in response to receiving the selection, associating a selected one or more virtual interfaces with the particular second device; and
presenting, on the display device, a local preview window comprising a visual indication of which of the one or more virtual interfaces are associated for transmission to each of the plurality of second devices designated to receive at least one virtual interface within a transmitted video stream.

18. The computer program product of claim 16, wherein the program instructions further enable the processor to perform the functions of:
detecting selection of a particular second device as an administrative device;
auto-selecting specific virtual interfaces having functions controllable by the selected administrative device; and
transmitting the auto-selected virtual interfaces concurrently with the primary segment to enable virtual interfaces to be visually presented within the second display of the particular second device concurrently with the primary segment.

19. The computer program product of claim 18, wherein the program instructions further enable the processor to perform the functions of:
monitoring for receipt of an indication of a remote selection or activation of at least one control function from within the virtual interfaces at the particular second device; and
in response to receiving an indication of a remote selection that is associated with a modification of a characteristic of the video images within the primary segment:
applying the modification to video image content within the primary segment at the electronic device; and transmitting the modification of the video image content to each of the plurality of second devices participating in the video communication session.

20. The computer program product of claim 16, wherein:
- the virtual interface comprises a window presented as an overlay in place of one of the at least one secondary segment, the virtual interface overlaying an original content within a location of the other segment; and
- the program instructions further enable the processor to perform the functions of:
  - in response to the virtual interface comprising a virtual white board overlaying one of the other segments, selectively transmitting a corresponding secondary segment overlayed with the virtual white board to enable cross sharing of content placed on the virtual white board with each selected second device that receives the corresponding secondary segment along with the primary segment.

\* \* \* \* \*